United States Patent
Zhang et al.

(10) Patent No.: US 10,915,798 B1
(45) Date of Patent: Feb. 9, 2021

(54) SYSTEMS AND METHODS FOR HIERARCHICAL WEBLY SUPERVISED TRAINING FOR RECOGNIZING EMOTIONS IN IMAGES

(71) Applicant: ADOBE INC., San Jose, CA (US)

(72) Inventors: Jianming Zhang, San Jose, CA (US); Rameswar Panda, San Jose, CA (US); Haoxiang Li, San Jose, CA (US); Joon-Young Lee, San Jose, CA (US); Xin Lu, San Jose, CA (US)

(73) Assignee: Adobe Inc., San Jose, CA (US)

( * ) Notice: Subject to any disclaimer, the term of this patent is extended or adjusted under 35 U.S.C. 154(b) by 177 days.

(21) Appl. No.: 15/980,636

(22) Filed: May 15, 2018

(51) Int. Cl.
| | |
|---|---|
| *G06K 9/66* | (2006.01) |
| *G06K 9/62* | (2006.01) |
| *G06K 9/00* | (2006.01) |
| *G06F 7/08* | (2006.01) |
| *G06N 7/00* | (2006.01) |
| *G06N 3/08* | (2006.01) |
| *G06F 16/58* | (2019.01) |
| *G06F 16/9535* | (2019.01) |

(52) U.S. Cl.
CPC .............. *G06K 9/66* (2013.01); *G06F 7/08* (2013.01); *G06F 16/5866* (2019.01); *G06F 16/9535* (2019.01); *G06K 9/00302* (2013.01); *G06K 9/00335* (2013.01); *G06K 9/00624* (2013.01); *G06K 9/623* (2013.01); *G06K 9/6277* (2013.01); *G06N 3/08* (2013.01); *G06N 7/005* (2013.01); *G06K 2209/27* (2013.01)

(58) Field of Classification Search
None
See application file for complete search history.

(56) References Cited

U.S. PATENT DOCUMENTS

2019/0228215 A1* 7/2019 Najafirad ........... G06K 9/00302

OTHER PUBLICATIONS

Joulin et al., Learning Visual Features from Large Weakly Supervised Data, arXiv:1511.02251v1 [cs.CV] Nov. 6, 2015, 11 pages. (Year: 2015).*

You etal., Building a Large Scale Dataset for Image Emotion Recognition: The Fine Print and The Benchmark, arXiv:1605.02677v1 [cs.AI] May 9, 2016, 7 pages. (Year: 2016).*

(Continued)

*Primary Examiner* — Iman K Kholdebarin
(74) *Attorney, Agent, or Firm* — Shook, Hardy & Bacon L.L.P.

(57) ABSTRACT

Disclosed herein are embodiments of systems, methods, and products for a webly supervised training of a convolutional neural network (CNN) to predict emotion in images. A computer may query one or more image repositories using search keywords generated based on the tertiary emotion classes of Parrott's emotion wheel. The computer may filter images received in response to the query to generate a weakly labeled training dataset labels associated with the images that are noisy or wrong may be cleaned prior to training of the CNN. The computer may iteratively train the CNN leveraging the hierarchy of emotion classes by increasing the complexity of the labels (tags) for each iteration. Such curriculum guided training may generate a trained CNN that is more accurate than the conventionally trained neural networks.

20 Claims, 22 Drawing Sheets

(56) References Cited

OTHER PUBLICATIONS

Joulin etal., Learning Visual Features from Large Weakly Supervised Data, arXiv: 1511.02251 vl [cs.CV] Nov. 6, 2015 (Year: 2015).*
Alameda-Pineda et al., Recognizing Emotions from Abstract Paintings Using Non-Linear Matrix Completion, 2016 IEEE Conference on Computer Vision and Pattern Recognition (CVPR), 11 pages.
Bengio et al., Curriculum Learning, Appearing in Proceedings of the 26th International Conference on Machine Learning, Montreal, Canada, 2009, 8 pages.
Benitez-Quiroz et al., EmotioNet: An accurate, real-time algorithm for the automatic annotation of a million facial expressions in the wild, Jun. 2016 IEEE Conference on Computer Vision and Pattern Recognition (CVPR), 22 pages.
Cesa-Bianchi et al., Incremental Algorithms for Hierarchical Classification, Journal of Machine Learning Research 7 (2006), pp. 31-54.
Chen et al., DeepSentiBank: Visual Sentiment Concept Classification with Deep Convolutional Neural Networks, arXiv:1410.8586v1 [cs.CV] Oct. 30, 2014, 7 pages.
Chen et al., Webly Supervised Learning of Convolutional Networks, arXiv:1505.01554v2 [cs.CV] Oct. 7, 2015, pp. 1-12.
Chu et al., Selective Transfer Machine for Personalized Facial Expression Analysis, HHS Public Access, IEEE Trans Pattern Anal Mach Intell, Author manuscript; available in PMC Sep. 28, 2017, pp. 1-47.
Chu et al., Video Co-summarization: Video Summarization by Visual Co-occurrence, 2015 IEEE Conference on Computer Vision and Pattern Recognition (CVPR), 9 pages.
Deng et al., Fast and Balanced: Efficient Label Tree Learning for Large Scale Object Recognition, Neural Information Processing Systems (NIPS) 2011, 9 pages.
Deng et al., Hedging Your Bets: Optimizing Accuracy-Specificity Trade-offs in Large Scale Visual Recognition, Jun. 2012 IEEE Conference on Computer Vision and Pattern Recognition, 8 pages.
Divvala et al., Learning Everything About Anything: Webly-Supervised Visual Concept Learning, Jun. 2014 IEEE Conference on Computer Vision and Pattern Recognition, 8 pages.
Dong et al., Multi-Task Curriculum Transfer Deep Learning of Clothing Attributes, arXiv:1610.03670v4 [cs.CV] Dec. 25, 2016, 10 pages.
Du et al., Compound facial expressions of emotion, PNAS, published online Mar. 31, 2014, www.pnas.org/cgi/doi/10.1073/pnas.1322355111, pp. E1454-E1462.
Ekman, An argument for basic emotions, (1992), Cognition & Emotion, 6:3-4, 169-200, 33 pages.
Eleftheriadis et al., Discriminative Shared Gaussian Processes for Multiview and View-Invariant Facial Expression Recognition, IEEE Transactions on Image Processing, vol. 24, No. 1, Jan. 2015, pp. 189-204, (17 pages).
Eleftheriadis et al., Joint Facial Action Unit Detection and Feature Fusion: A Multi-conditional Learning Approach, Journal of Latex Class Files, vol. 14, No. 8, Aug. 2015, pp. 1-15.
Elman, Learning and development in neural networks: the importance of starting small, Cognition, 48 (1993) pp. 71-79.
Gan et al., Webly-supervised Video Recognition by Mutually Voting for Relevant Web Images and Web Video Frames, published 2016 in European Conference on Computer Vision (ECCV), 17 pages.
Gan et al., You Lead, We Exceed: Labor-Free Video Concept Learning by Jointly Exploiting Web Videos and Images, Jun. 2016 IEEE Conference on Computer Vision and Pattern Recognition (CVPR), pp. 923-932.
Gao et al., On-Demand Learning for Deep Image Restoration, In Proceedings of the International Conference on Computer Vision (ICCV), 2017, 10 pages.
Griffin et al., Learning and Using Taxonomies for Fast Visual Categorization, Jun. 2008 IEEE Conference on Computer Vision and Pattern Recognition, 8 pages.
Gygli et al., Creating Summaries from User Videos, 2014 European Conference on Computer Vision (ECCV), 16 pages.
He etal., Deep Residual Learning for Image Recognition, arXiv:1512.03385v1 [cs.CV] Dec. 10, 2015, pp. 1-12.
Hussain et al., Automatic Understanding of Image and Video Advertisements, Jul. 2017 Computer Vision and Pattern Recognition (cs.CV), arXiv:1707.03067v1, 11 pages.
Jia et al., Caffe: Convolutional Architecture for Fast Feature Embedding, arXiv:1408.5093v1 [cs.CV] Jun. 20, 2014, 4 pages.
Jia et al., Visual Concept Learning: Combining Machine Vision and Bayesian Generalization on Concept Hierarchies, 2013 Neural Information Processing Systems (NIPS), pp. 1-9.
Joo et al., Visual Persuation: Inferring Communicative Intents of Images, Jun. 2014 IEEE Conference on Computer Vision and Pattern Recognition, 8 pages.
Jou et al., Predicting Viewer Perceived Emotions in Animated GIFs, ACM Multimedia Conference at Orlando, Florida, Nov. 2014, 4 pages.
Joulin et al., Learning Visual Features from Large Weakly Supervised Data, arXiv:1511.02251v1 [cs.CV] Nov. 6, 2015, 11 pages.
Kahou et al., Combining Modality Specific Deep Neural Networks for Emotion Recognition in Video, 15th ACM on International Conference on Multimodal Interaction (ICMI), Sydney, Australia, Dec. 2013, 8 pages.
Khosla et al., Undoing the Damage of Dataset Bias, 12th European Conference on Computer Vision, Florence, Italy, Oct. 2012, 14 pages.
Kim et al., Building Emotional Machines: Recognizing Image Emotions Through Deep Neural Networks, arXiv:1705.07543v2 [cs.CV] Jul. 3, 2017, pp. 1-11.
Kosti et al., Emotion Recognition in Context, Jul. 2017 IEEE Conference on Computer Vision and Pattern Recognition Workshops (CVPRW), pp. 1667-1675.
Krause et al., The Unreasonable Effectiveness of Noisy Data for Fine-Grained Recognition, arXiv:1511.06789v3 [cs.CV] Oct. 18, 2016, pp. 1-26.
Lee et al., Learning the Easy Things First: Self-Paced Visual Category Discovery, In Proceedings of the IEEE Conference on Computer Vision and Pattern Recognition (CVPR), Jun. 2011, pp. 1721-1728.
Li et al., Building and Using a Semantivisual Image Hierarchy, Jun. 2010 IEEE Computer Society Conference on Computer Vision and Pattern Recognition, 8 pages.
Li et al., WebVision Database: Visual Learning and Understanding from Web Data, arXiv:1708.02862v1 [cs.CV] Aug. 9, 2017, 9 pages.
Liang et al., Exploiting Multi-modal Curriculm in Noisy Web Data for Large-scale Concept Learning, arXiv:1607.04780v1 [cs.CV] Jul. 16, 2016, 11 pages.
Liang et al., Learning to Detect Concepts from Webly-Labeled Video Data, Twenty-Fifth International Joint Conference on Artificial Intelligence (IJCAI-16), Jul. 2016, pp. 1746-1752.
Machajdik et al., Affective Image Classification Using Features Inspired by Psychology and Art Theory, 18th ACM International Conference on Multimedia, Firenze, Italy, Oct. 2010, p. 83-92.
Marszalek et al., Semantic Hierarchies for Visual Object Recognition, Jun. 2007 IEEE Conference on Computer Vision and Pattern Recognition, 7 pages.
Ng et al., Deep Learning for Emotion Recognition on Small Datasets Using Transfer Learning, Nov. 2015 ACM on International Conference on Multimodal Interaction, 7 pages.
Panda et al., Collaborative Summarization of Topic-Related Videos, arX1706.03114v1 [cs.CV], Jun. 9, 2017, 10 pages.
Peng et al., A Mixed Bag of Emotions: Model, Predict, and Transfer Emotion Distributions, Jun. 2015 IEEE Conference on Computer Vision and Pattern Recognition (CVPR), pp. 860-868.
Pentina et al., Curriculum Learning of Multiple Tasks, arXiv:1412.1353v1 [stat.ML] Dec. 3, 2014, 13 pages.
Plutchik, Chapter 1, "A General Psychoevolutionary Theory of Emotion", Emotion Theory, Research, and Experience, vol. 1, Theories of Emotion, copyright 1980, pp. 3-33.
Rohde et al., Language Acquisition in the Absence of Explicit Negative Evidence: How Important is Starting Small?, Cognition 72(1):67-109, Sep. 1999, pp. 1-33.

(56) References Cited

OTHER PUBLICATIONS

Shaver et al., Reading 1, "Emotion Knowledge: Further Exploration of a Prototype Approach", Emotions in Social Psychology, copyright 2001, pp. 26-56.

Silla, Jr. et al., A Survey of Hierarchical Classification Across Different Application Domains, Data Mining and Knowledge Discovery, vol. 22, Issue 1-2, 22(1):31-72, Jan. 2011, pp. 1-41.

Soleymani et al., Analysis of EEG signals and facial expressions for continuous emotion detection, IEEE Transactions on Affective Computing vol. 7, Issue 1, Jan. 2016, pp. 1-13.

Srivastava et al., Discriminative Transfer Learning with Tree-based Priors, 26th International Conference on Neural Information Processing Systems—vol. 2, Lake Tahoe, Nevada, Dec. 2013, 12 pages.

Sukhbaatar et al., Learning from Noisy Labels with Deep Neural Networks, arXiv:1406:2080v1 [cs.CV] Jun. 9, 2014, 10 pages.

Sun et al., Revisiting Unreasonable Effectiveness of Data in Deep Learning Era, arXiv:1707.02968v2 [cs.CV] Aug. 4, 2017, 13 pages.

Tommasi et al., A Deeper Look at Dataset Bias, arXiv:1505.01257, May 6, 2015, 19 pages.

Torralba et al., Unbiased Look at Dataset Bias, Conference Paper, CVPR'11, Jun. 2011, pp. 1521-1528.

Tousch et al., Semantic hierarchies for image annotation: A survey, Pattern Recognition (2011), doi: 10.1016/j.patcog.2011.05.017, pp. 1-13.

Tran et al., Learning Spatiotemporal Features with 3D Convolutional Networks, Dec. 2015 IEEE International Conference on Computer Vision (ICCV), 16 pages.

Verma et al., Learning Hierarchical Similarity Metrics, Jun. 2012 IEEE Conference on Computer Vision and Pattern Recognition (CVPR), 8 pages.

Wang et al., Multiple Granularity Descriptors for Fine-grained Categorization, Dec. 2015 IEEE International Conference on Computer Vision (ICCV), pp. 2399-2406.

Wang et al., Modeling Emotion Influence in Image Social Networks, IEEE Transactions on Affective Computing, vol. 6, No. 1, Jan. 2007, pp. 1-13.

Wu et al., Inferring Emotional Tags from Social Images with User Demographics, IEEE Transactions on Multimedia, vol. 14, No. 8, Aug. 2015, pp. 1-15.

Xiao et al., Error-Driven Incremental Learning in Deep Convolutional Neural Network for Large-Scale Image Classification, ACM Multimedia, Nov. 1, 2014, pp. 177-186.

Xu et al., Heterogeneous Knowledge Transfer in Video Emotion Recognition, Attribution and Summarization, IEEE Transactions on Affective Computing, Oct. 27, 2016, pp. 1-16.

Xu et al., Video Emotion Recognition with Transferred Deep Feature Encodings, Jun. 2016 ACM on International Conference on Multimedia Retrieval (ICMR), 8 pages.

Yan et al., HD-CNN: Hierarchical Deep Convolutional Neural Network for Large Scale Visual Recognition, arXiv:1410.0736v4 [cs.CV] May 16, 2015, pp. 4321-4329.

You et al., Building a Large Scale Dataset for Image Emotion Recognition: The Fine Print and The Benchmark, arXiv:1605.02677v1 [cs.AI] May 9, 2016, 7 pages.

You et al., Robust Image Sentiment Analysis Using Progressively Trained and Domain Transferred Deep Networks, arXiv:1509.06041v1 [cs.CV] Sep. 20, 2015, 9 pages.

Zhang et al., Curriculum Domain Adaptation for Semantic Segmentation of Urban Scenes, arXiv:1707.09465v2 [cs.CV] Aug. 5, 2017, 12 pages.

Zhao et al., Exploring Principles-of-Art Features for Image Emotion Recognition, 22nd ACM International Conference on Multimedia (MM), Orlando, Florida, Nov. 2014, 10 pages.

* cited by examiner

Surprise

Zest

Horror

1602

SYSTEMS AND METHODS FOR HIERARCHICAL WEBLY SUPERVISED TRAINING FOR RECOGNIZING EMOTIONS IN IMAGES

TECHNICAL FIELD

This application relates generally to computationally inferring emotions in images, and more particularly to a curriculum guided training of a convolutional neural network using weakly labeled stock images to infer emotions in images.

BACKGROUND

Recognizing emotions in images comes naturally for humans through hundreds of thousands years of evolution, but is algorithmically and computationally challenging for computing machines. Computing machines do not have the inherent human skills to quickly recognize patterns, generalize from prior knowledge, and adapt to different image environments. Computer trained emotion recognition models that incorporate the computational complexity required for emotion recognition have been increasingly popular as solution attempts to the aforementioned challenges in recognizing emotions in natural images, such as photographs. However, conventionally trained emotion recognition models have several technical shortcomings and often fail to generate accurate results.

For instance, as shown in FIG. 1, an example image 100 of an amusement park that has an overall negative emotion (sadness) that is readily recognizable as being negative, but a conventional trained computer model, such as a ResNet 50, that is trained on a large image dataset has difficulty recognizing the negative human emotion caused by the image. Using the image 100, the conventional trained model, in fact, predicted an emotion of "amusement/joy" with 99.9% confidence. However, many people will agree that the image 100, which is a photograph of a dilapidated, abandoned Six Flags theme park in New Orleans closed after Hurricane Katrina, certainly does not convey amusement and/or joy, but rather sadness. This problem of inaccurate predication is prevalent among conventional trained emotion recognition models that have undergone a fully supervised training based on a conventionally used limited training dataset.

The lesson from this example image 100 is that despite best efforts, an illustrative conventional image training set 102 may have a strong design bias, suffering from both positive and negative biases. The conventional training dataset 102 is shown to contain a first set of image samples 104 for an "amusement" category and a second set of image samples 106 for "sadness" category. The image samples 104 for the amusement category are full of amusement parks, thereby creating a strong positive bias for an image showing an amusement park to be predicted to belong to the amusement category. In other words, there is a lack of diversity of visual concepts for amusement in the image samples 104. The image samples 106 for the sadness category represent a negative set bias, where the rest of the world is not well represented. For example, the image samples 104 do not contain any images of sad parks or play areas, thereby creating a strong bias against an image showing an amusement park to be predicted to belong to the sadness category.

Furthermore, a fully supervised training process involves manual tagging of images with emotion tags, which is inefficient, cumbersome, and unamenable to generalization. Moreover, a conventional model trained using the manually tagged images may pick up idiosyncrasies in the tags and lose the ability of generalization.

SUMMARY

Systems and methods described herein attempt to solve the technical problems of bias in training datasets and cumbersome manual tagging for fully supervised machine training methods. A trained convolutional neural network described herein attempts to produce more accurate emotion identification results compared to the conventionally trained neural networks.

In an embodiment, a process that collects images by utilizing an emotion hierarchy with associated keywords from psychology terminology may reduce positive and negative bias of an image set. In addition, an effective course-to-fine hierarchical learning strategy that leverages a hierarchical structure of an emotion wheel, i.e., grouping of emotion categories derived from psychology, to imitate easy-to-hard learning of different tasks in cognitive studies may be utilized.

Embodiments disclosed herein describe a computer and a computer implemented method that leverage hierarchical emotional classification for a curriculum based webly supervised training with a weakly labeled training dataset. The computer may query stock images using search keywords generated based on the hierarchical emotional classification, for example, Parrott's emotion wheel, and retrieve the weakly labeled (i.e., image tags being the search keywords) images in response to the query. After filtering the images and cleaning up the tags to generate a training dataset, the computer may iteratively train a conventional neural network with increasing granularity of emotion classes in the training dataset. During each successive training iteration, the computer may leverage as a priori the previous training iteration such that the training may become curriculum guided: starting from a lower complexity training dataset and moving to a higher complexity training dataset. Based on the curriculum guided training, the computer may generate a trained convolutional neural network that may more accurately identify emotions in images with more accuracy as compared to conventionally trained neural networks used for inferring emotion.

In an embodiment, a computer implemented method comprises retrieving, by a computer, a set of images and associated tags from a data repository, at least one of the tags being indicative of emotion; selecting, by the computer, a subset of the set of images by removing images based on an associated tag; training, by the computer, a convolutional neural network at a first training stage, the first training stage includes applying the subset of images to the convolutional neural network configured to identify a probability that each image is associated with each class of a set of first classes of emotion, thereby adjusting at least one weighting within the convolutional neural network; training, by the computer, the convolutional neural network at a second training stage, the second training stage includes applying the subset of images to the convolutional neural network configured to identify a probability that each image is associated with each class of a set of second classes of emotion, and the set of second classes is greater than the set of first classes; training, by the computer, the convolutional neural network at a third training stage, the third training stage includes applying the subset of images to the convolutional neural network configured to identify a probability that each image is associated with each class of a set of third classes of emotion, and the set of third classes is greater than the set of second classes, each of the first, second, and third training stages causing at least one weighting of the convolutional neural network to be adjusted; inputting, by the computer, a new image into the convolutional neural network; and labelling, by the computer, the new image based on a probability of at least one class from the set of third classes of emotion for the new image.

In another embodiment, a computer implemented method comprises receiving, by a convolutional neural network hosted on a computer, an input from a graphical user interface of a new image and an associated tag; generating, by the convolutional neural network hosted on the computer, for the new image an emotion tag corresponding to one or more classes of emotions, whereby the convolutional neural network is trained with a plurality of stages that identify a probability that a training image is associated with a hierarchical class of emotions, each stage causing an adjusted weighting of the convolutional neural network, and whereby the convolutional neural network uses the associated tag to generate a probability that the new image is associated with a class of emotion within the hierarchical class of emotions; and outputting, by the computer, the emotion tag for display on a revised graphical user interface.

In yet another embodiment, a computer readable non-transitory medium contains one or more computer instructions, which when executed by a processor cause the processor to select a subset of a set of images by filtering images based on associated tags; iteratively train a neural network at a plurality of stages, each stage applying the convolutional neural network to identify a probability that each image is associated with an emotion in a class of emotions, each stage applying a new class of emotions with more emotions than in a previous stage, and each stage causing an adjusted weighting of the neural network; and label a new image inputted into the neural network based on a probability of at least one emotion from a class of emotions from the latest stage.

BRIEF DESCRIPTION OF THE DRAWINGS

The accompanying drawings constitute a part of this specification and illustrate embodiments of the subject matter disclosed herein.

DETAILED DESCRIPTION

Figure 1:
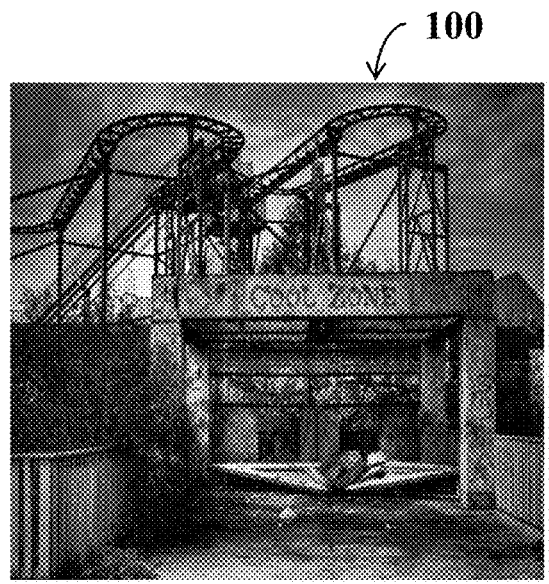
FIG. 1 shows a test image incorrectly predicted by a conventionally trained neural network and sample images used to conventionally train the neural network.
Figure 1:
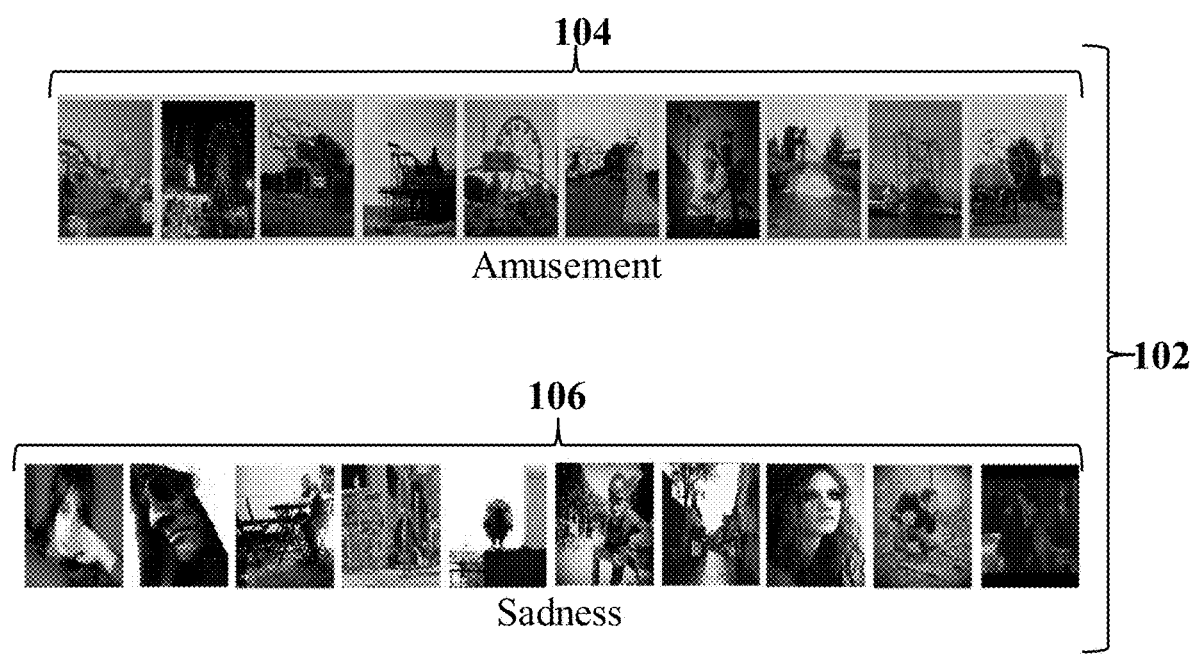

A process that collects images by utilizing an emotion hierarchy with associated keywords from psychology terminology may be utilized in training a convolutional neural network for inferring emotions in images. The emotion hierarchy, for example, may reduce positive and negative bias of an image set, which may improve accuracy of the convolutional neural network. An effective course-to-fine hierarchical learning strategy that leverages hierarchical structure of an emotion wheel to imitate easy-to-hard learning of different tasks in cognitive studies may be utilized. Using a large image dataset with weakly labeled images, an initial computer-implemented process to "clean" the image labels may be performed prior to conducting computer-implemented hierarchical training of the convolutional neural network.

To support the hierarchical learning strategy, systems, methods, and products for a webly supervised training of a convolutional neural network (CNN) predict emotion in images. A computer may query one or more image repositories using search keywords generated based on the tertiary emotion classes, such as those provided by Parrott's emotion wheel. An emotion wheel may be a hierarchical grouping of emotions derived from psychology. Images received may be filtered in response to the query to generate a weakly labeled training dataset. The computer may iteratively train the CNN leveraging the hierarchy of emotion classes by increasing the complexity of the labels (tags) for each iteration. The computer may use the curriculum guided training to generate a trained CNN that is more accurate than the conventionally trained neural networks. As a result, there is no need for a cumbersome and inefficient manual emotion tagging of the images.

The Parrott's emotion wheel, as used herein, may contain three levels of emotion classes. The first level (Level-1) of emotion classes, also referred to as primary emotion classes, may include "positive" and "negative" emotion classes. The second level (Level-2) of emotion classes, also referred to as secondary emotion classes, may include six emotion classes: "anger," "fear," "joy," "love," "sadness," and "surprise." The third level (Level-3) of emotion classes, also referred to as tertiary emotion classes, may include twenty five emotion classes: "affection," "cheerfulness," "contentment," "disappointment," "disgust," "enthrallment," "envy," "exasperation," "gratitude," "horror," "irritability," "lust," "neglect," "nervousness," "optimism," "pride," "rage," "relief," "sadness," "shame," "suffering," "surprise," "sympathy," and "zest." The granularity of the emotion classes may therefore be in ascending order from Level-1 to Level-2 to Level-3. Furthermore, the levels may be hierarchical, where a larger number of Level-3 emotion classes may be grouped into a smaller number of Level-2 emotion classes, and a larger number of Level-2 emotion classes may be grouped into a smaller number of Level-1 emotion classes, as described below.

A computer may leverage this hierarchical grouping of emotion classes for a webly-supervised training of a CNN. In a first training iteration, the computer may use a set of training images and tags associated with Level-1 emotion classes. After the first iteration, the CNN may be able to make a coarse inference of "positive" and "negative" emotion classes in test images. In a second training iteration, the computer may feed the set of training images and tags associated with Level-2 emotion classes to the CNN trained by the first iteration of training. After the second iteration, the CNN may be able to make a less coarse inference of Level-2 emotion classes in test images. In a third training iteration, the computer may feed the set of training images and tags associated with Level-3 emotion classes to the CNN trained by the second iteration of training. After the third iteration, the fully trained CNN may be able to make a fine inference of Level-3 emotion classes in the test images. The computer may, therefore, train the CNN from easier to harder tasks, such that training may enable the CNN to generalize the inference process and not learn unimportant idiosyncrasies as with the conventionally (human) trained neural networks.

Furthermore, compared to conventional systems and methods, the computer may generate a large database—larger by at least one order of magnitude—thereby minimizing the training dataset biases. The computer does not require manual tagging as in fully supervised training methods, which limits the number and variety and images for the training dataset, thereby generating the strong positive and negative biases. Instead, the computer generates multiple keywords based on the tertiary emotions for searching and retrieving images. The retrieved images may therefore have weak labels (or tags) based on the search keywords. Such weakly labeled images may undergo a computer implemented filtering, but may not require manual tagging with emotion tags or labels as in the conventional methods of training an image dataset. By utilizing the principles described herein, the computer may train the CNN-based training by using a large quantity of relatively noisy data. The use of a large quantity of relatively noisy data may be more efficient than using a small quantity of clean data, and may avoid the inherent biases in the clean data, as previously described.

Figure 2:
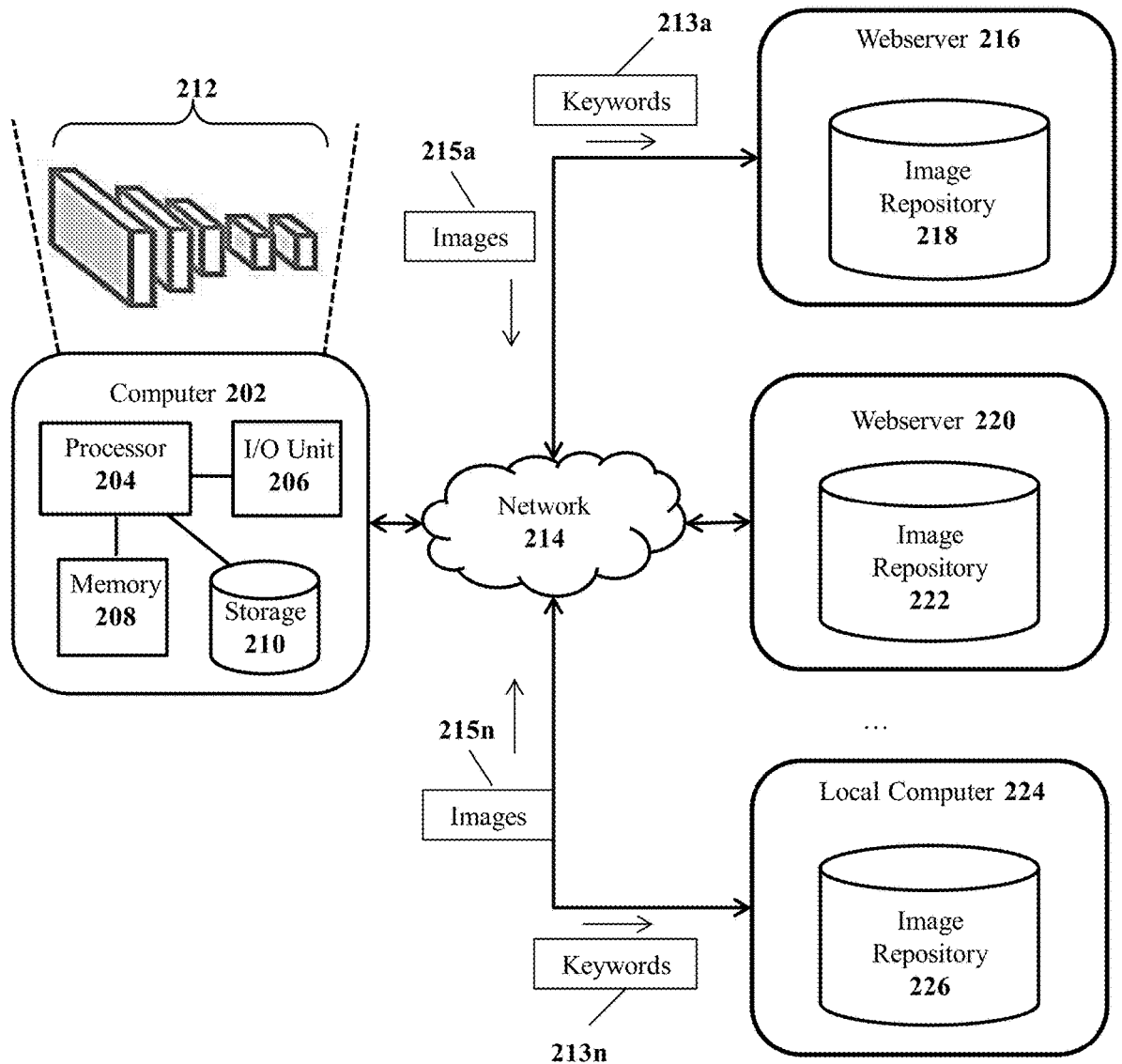
FIG. 2 shows a network environment for webly supervised training of a convolutional neural network to infer emotions in images, according to an illustrative embodiment.

FIG. 2 shows a network environment 200 for a webly supervised machine training of a neural network, such as a convolutional neural network, for predicting emotions in images. The network environment 200 may comprise a computer 202, a network 214, webservers 216, 220, and a local computer 224. It should be understood that listed components of the network environment 200 are merely illustrative and additional, substitute, or lesser number of components should be considered within the scope of this disclosure.

The computer 202 may include a processor 204, an input output (I/O) unit 206, a memory 208, and storage 210. The processor 204 may include any type of processor that may implement one or more instruction sets to enable the processing functionality of the computer 202. For example, the processor 204 may command and control (i) retrieving of images with weakly associated labels (e.g., object and emotion labels that are "noisy" due to being descriptors that poorly or wrongly describe the image and/or emotion) from the webservers 216, 220 and the local computer 224, (ii) filtering or "cleaning" the retrieved images based on the labels to generate a training image set, and (iii) iteratively training a convolutional neural network (CNN) 212 to generate a trained CNN 212 that can predict the emotion in other images. The I/O unit 206 may receive inputs from and transmit outputs to the network 214. The outputs may be the keywords 213a-213n (collectively 213) used to retrieve images from the webservers 216, 220 and the local computer 224 through the network 214. The inputs may be the images 215a-215n (collectively 215) transmitted by the webservers 216, 220 and the local computer 224 through the network 214. The memory 208 may be any type of non-transitory memory from which the processor 204 may read input instructions and input data, and to which write output instructions and output data. For instance, the memory may be a random access memory (RAM), cache memory, and/or virtual memory implemented by the operating system of the computer 202 utilizing a portion of the storage 210. The storage 210 may any type of electronic storage, such as a hard drive, to store the software modules and images used by the processor 204 to train and implement the CNN 212. In other words, the processor 204, I/O unit 206, the memory 208, the storage 210, and the software modules may collectively host, train, and implement the CNN 212.

The network 214 may be any type of network implementing one or more communication protocols between the computer 202, webservers 216, 220, and the local computer 224. Examples of the network 214 include, but are not limited to, Local Area Network (LAN), Desk Area Network (DAN), Wireless Local Area Network (WLAN), Metropolitan Area. Network (MAN), Wide Area Network (WAN), and the Internet. The communication over the network 214 may be performed in accordance with the one or more communication protocols, such as Transmission Control Protocol and Internet Protocol (TCP/IP). User Datagram Protocol (UDP), and IEEE communication protocols.

The webserver 216 may any kind of server or a computer containing an image repository 218. In some embodiments, the webserver 216 may host a website, and the computer 202 may execute web crawling software modules using the keywords 213 to download the images 215 in the image repository 218 through the network 214. In other implements, the computer may retrieve images 215 based on the keywords from the image repository 218 through transfer protocols as File Transfer Protocol (FTP) and Simple Mail Transfer Protocol (SMP). The images stored in the image repository 218 may be in any format including, but not limited to, Joint Photographic Experts Group (JPEG), Bitmap (BMP), Tagged Image File Format (TIFF), Portable Document Format (PDF), and/or Portable Network Graphics (PNG). Associated tags and/or labels may be stored with or in relation to the images.

The webserver 220 may be any kind of server or a computer containing an image repository 222. In some embodiments, the webserver 220 may host a website, and the computer 202 may execute web crawling software modules using 213 keywords to download the images 215 in the image repository 222 through the network 214. In other implements, the computer may retrieve images 215 based on the keywords 213 from the image repository 222 through transfer protocols as File Transfer Protocol (FTP) and Simple Mail Transfer Protocol (SMP). The images stored in the image repository 222 may in any format including, but not limited to, Joint Photographic Experts Group (JPEG), Bitmap (BMP), Tagged Image File Format (TIFF), Portable Document Format (PDF), and/or Portable Network Graphics (PNG).

The local computer 224 may be any kind of server or computer that the computer 202 may have a local access through the network 214. For example, the computer 202 and the local computer 224 may be owned by the same enterprise and connected to each other via a Local Area Network. The computer 202 may retrieve images stored in the image repository 226 using the keywords 213. The images stored in the image repository 222 may in any format including, but not limited to, Joint Photographic Experts Group (JPEG), Bitmap (BMP), Tagged Image File Format (TIFF), Portable Document Format (PDF), and/or Portable Network Graphics (PNG). Associated tags and/or labels may be stored with or in relation to the images.

In operation, the computer 202 may query one or more of the image repositories 218, 222, 226 using keywords 213 generated based on a hierarchical emotion tags. The computer 202 may receive a set of images (and associated weak labels) 215 based on the query. The computer 202 may then then filter or clean the set of images 215 to generate a set of training images (not shown) from the set of images 215 with labels having reduced noise. The filtering may further include removing duplicate images, removing non-English tags associated with the images 215, and running a trained classifier to discard images and/or labels with a lower confidence level. From the set of training images, the computer 202 may iteratively train the CNN 212.

Figure 3:
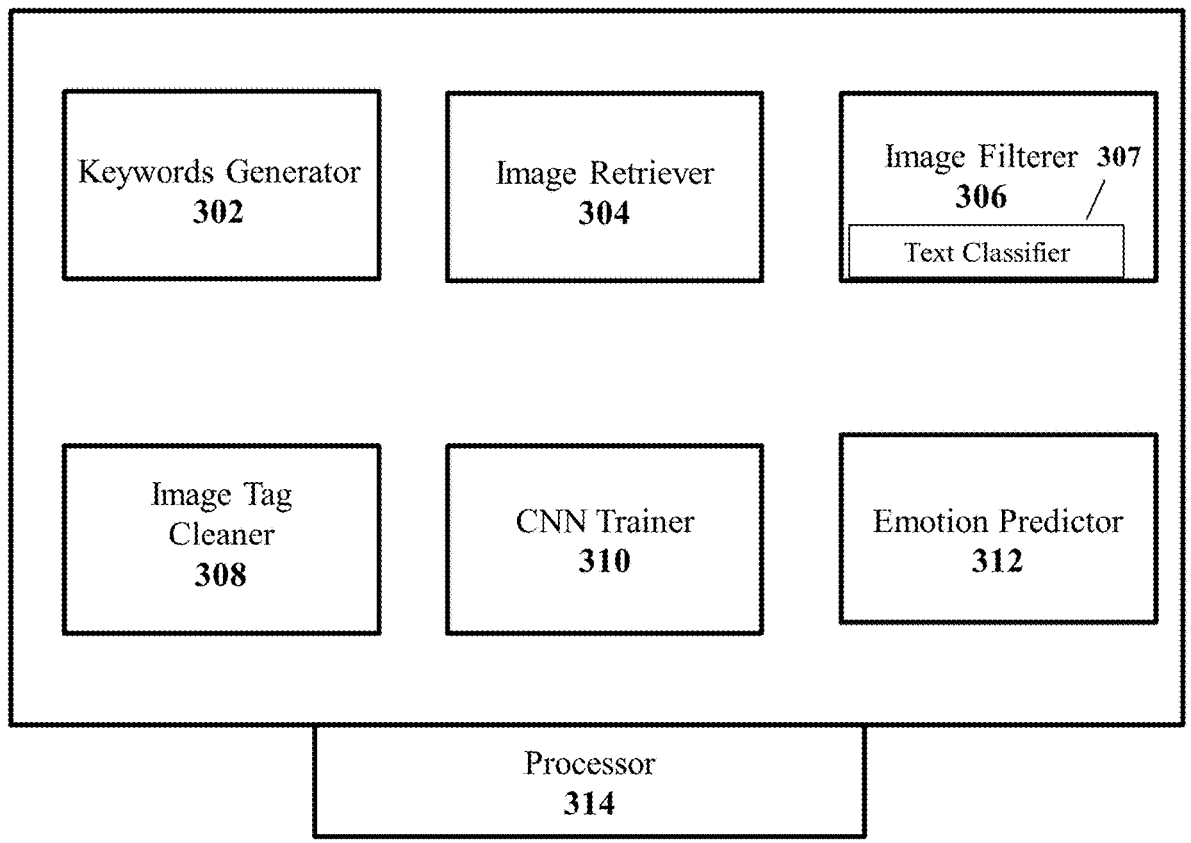
FIG. 3 shows a block diagram of software modules for executing a webly supervised training of a convolutional neural network to infer emotions in images, according to an illustrative embodiment.

FIG. 3 shows a block diagram showing illustrative software modules 300 implementing one or more processes described throughout this disclosure. A processor 314 may execute the software modules 300. The software modules 300 may include a keywords generator module 302, an image retriever module 304, an image filterer module 306, an image tag cleaner module 308, a CNN trainer module 310, and an emotion predictor module 312.

The keywords generator module 302 may generate search keywords to query one or more image repositories. In some implementations, the keywords generator module 302 may generate keywords based upon user inputs. The keywords generator module 302 may further provide the user with an electronic dictionary or thesaurus interface and functionality to generate synonyms or words with similar shades of meanings as different emotion classes. The keywords generator module 302 may provide an interface and functionality to generate action-concept pair keywords. The keywords generator module 302 may also provide an interface and functionality for word-processing, such as spell and syntax checking.

The image retriever module 304 may query different image repositories based on the keywords generated by the keywords generator module 302, and retrieve the images based on the respective queries. The query may include webcrawling on websites, structured query language (SQL) queries to an image repository, and/or any other type of queries. The image retriever module 304 may retrieve images from one or more networks through one or communication protocols, as described above.

The image filterer module 306 may filter the images retrieved by the image retriever module 304. For example, the image filterer module 306 may remove duplicates from the images. In another example, the image filterer module 306 may remove images with non-English tags. In yet another example, the image filterer module 306 may train a text classifier 307 based on the tags and their emotion class such that the text classifier may predict an emotion class of an image tag. The image filterer module 306 may use the text classifier 307 to predict the emotion classes from the retrieved images. The image filterer module 306 may then remove the images with inconsistent predictions. For example, if the image retrieve module 304 receives an image in response to a happy emotion class keyword and the text classifier 307 predicts the emotion class of anger, the image filterer module 306 may discard the image. The text classifier 307 as implemented by the image filterer module 306 may use any kind of machine learning model. In some embodiments, the image filterer module 306 may use Naïve Bayes. In this machine learning model, the image filterer module 306 may select the most discriminative tags based on the entropy of the tags. The image filterer module 306 may then train the text classifier 307 based on the selected tags. The processor 314 may use the filtered images generated by the image filterer module 306 as a set of training images.

The image tag cleaner module 308 may clean or correct errors in the image tags. For example, the image tag cleaner module 308 may recognize spelling or syntax errors in the image tags and correct such recognized errors. In another example, the image tag clean module 308 may determine that a tag is not relevant or appropriately related to the image, using statistical models, vectorizing, ontology models, or otherwise. Furthermore, the tags may be noisy or wrong in other ways and the tag cleaner module 308 may use one or more heuristic algorithm to remove the noise, such as to change the tags to be consistent with search terminology (see, e.g., Table II below) used by a neural network (e.g., a convolutional neural network), in the tags. The convolutional neural network (CNN) trainer module 310 may iteratively train a CNN by feeding in the set of training images generated by the image filterer module 306. In a first iteration of the training, the CNN trainer module 310 may feed in the training images with associated Level-1 emotion tags. In a second iteration of the training, the CNN trainer module 310 may feed the training images with associated Level-2 emotion tags. In a third iteration of the training, the CNN trainer module 310 may feed in the training images with associated Level-3 tags. The CNN trainer module 310 may therefore execute curriculum guided training by incrementally increasing the complexity of the training dataset using more granular image tags for each successive iteration of the training. The emotion predictor module 312 may use the trained CNN generated by the CNN trainer module 310 to predict (or infer) an emotion in a provided image. For example, the emotion predictor module 312 may enable a user interface for a user to input an image to the trained CNN and the emotion predictor module 312 may invoke the trained CNN for the emotion prediction.

One having ordinary skill in the art should understand that the respective functionality of the aforementioned software modules is merely illustrative and similar functionality may be achieved by different set of software modules. Furthermore, the software modules described herein may achieve alternative and additional functionality, which should be considered to be within the scope of this disclosure.

Figure 4:
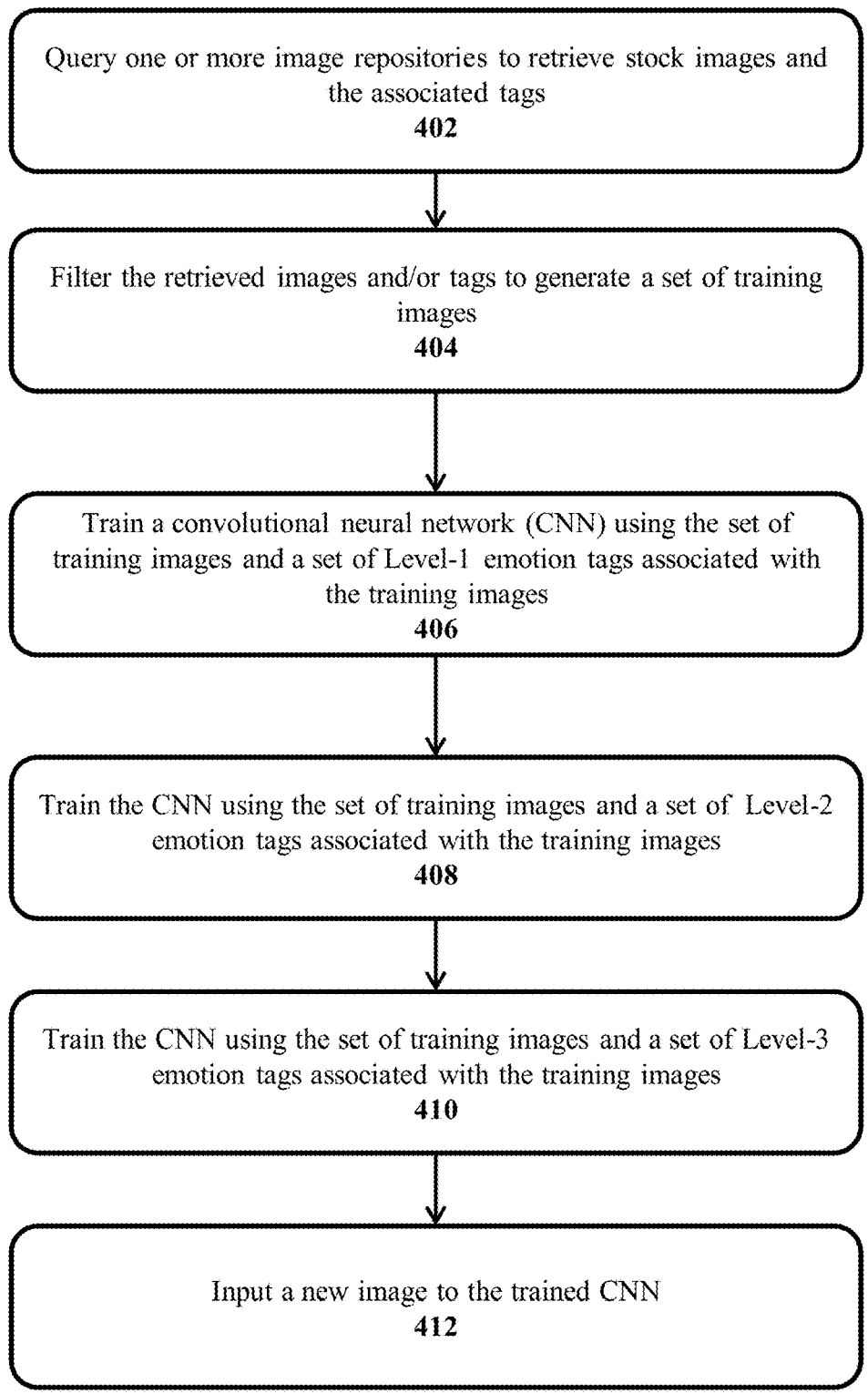
FIG. 4 shows a flow diagram of a method for webly supervised training of a convolutional neural network to infer emotions in natural images, according to an illustrative embodiment.

FIG. 4 shows a method 400 of webly supervised learning for inferring emotions from natural images, according an illustrative embodiment. Although multiple computers and multiple databases may implement the various steps of the method 400, the following describes, for brevity, a computer implementing the method 400. Furthermore, one having ordinary skill in the art understands that the method 400 may implement other alternative or additional steps than the one described below, and may skip one or more of the steps described below.

In a first step 402, the computer may query one or more image repositories to retrieve stock images and the associated tags. The query may be based on keywords generated using a three-level emotion hierarchy based on Parrott's emotion wheel. The three level-emotion hierarchy may be arranged in an increasing order of granularity, i.e., the arrangement may have coarse-to-fine emotional hierarchy. Table I shows an illustrative emotion hierarchy:

TABLE I

An illustrative three-level coarse-to-fine emotion hierarchy

| Level - 1 Emotions | Level - 2 Emotions | Level - 3 Emotions |
|---|---|---|
| negative | anger | disgust |
| | | envy |
| | | exasperation |
| | | Irritability |
| | | rage |
| negative | fear | confusion |
| | | horror |
| | | nervousness |
| negative | sadness | disappointment |
| | | neglect |
| | | sadness |
| | | shame |
| | | suffering |
| | | sympathy |
| positive | joy | cheerfulness |
| | | contentment |
| | | enthrallment |
| | | optimism |
| | | pride |
| | | relief |
| | | zest |
| positive | love | affection |
| | | gratitude |
| | | lust |
| positive | surprise | surprise |

The Level-1 emotions shown in Table I may indicate a coarse "negative" or "positive" emotion. The Level-2 emotions shown in Table I may indicate finer emotions compared to Level-1 emotions. In other words, multiple Level-2 emotions may be categorized into a lesser number of Level-1 emotions. As shown herein, Level 2 emotions of "anger," "fear," and "sadness" may be categorized into a negative Level-1 emotion and Level 2 emotions of "joy," "love," and "surprise" may be categorized into a positive Level-1 emotion. In this illustrative three-level hierarchy, the Level-3 emotions may be most granular. In other words, a plurality of Level-3 emotions may be categorized into a lesser number of Level-2 emotions. As shown in Table I, Level-3 emotions of "disgust," "envy," "exasperation," "irritability," "rage" may be categorized to Level-2 emotions of "anger;" Level-3 emotions of "confusion," "horror," and "nervousness" may be categorized into Level-2 emotion of "fear;" Level-3 emotions of "disappointment," "neglect," "sadness," "shame," "suffering," and "sympathy" may be categorized into Level-2 emotion of "sadness;" Level-3 emotions of "cheerfulness," "contentment," "enthrallment," "optimism," "pride," "relief," and "zest" may be categorized into Level-2 emotion of "joy;" Level-3 emotions of "affection," "gratitude," and "lust" may be categorized into Level-2 emotion of "love;" and Level-3 emotion of "surprise" may be categorized into Level-2 emotion of "surprise." It should be understood that a wide range of emotion hierarchal configurations and terminologies may be utilized.

For each of Level-3 emotions, a user may generate search keywords to query the one or more repositories. Table II shows an illustrative list of search keywords for Level-3 emotions

TABLE II

Illustrative list of search keywords for Level-3 emotions.

| Level - 3 Emotions | Search Keywords |
|---|---|
| disgust | contempt, disgust, disgusting, loathing, loath, loathsome |
| envy | envy, jealous, jealousy |
| exasperation | exasperation, frustrated, frustration, frustrating |
| irritability | aggravated, aggravation, agitated, annoy, annoyance, annoyed, grouchy, irritate, irritated, irritation |
| rage | anger, angry, bitterness, dislike, ferocious, ferocity, fury, hate, hatred, rage, resent, resentful, resentment, scorn, spite, wrath |
| confusion | confused, confusion, doubt, doubtful, hesitant, hesitation, perplexed, unsure |
| horror | fear, fearful, fright, horror, hysteria, panic, shock, shocked, terrified, terror |
| nervousness | anxiety, anxious, apprehension, apprehensive, distressful, dread, dreadful, nervous, nervousness uneasiness, uneasy, worried, worry |
| cheerfulness | amused, amusing, cheer, cheerful, cheerfulness, delight, delightful, elation, enjoy, enjoyment, euphoria, fun, funny, glad, gladness, glee, happines, happy, harmony, joy, satisfied |
| contentment | contentment, pleased, pleasure |
| enthrallment | rapture |
| optimism | confidence, confident, eager, hope, hopeful, optimism |
| pride | proud, success, successful, triumph |
| relief | calm, peaceful, relax, relaxed, relaxing, relief |
| zest | enthusiasm, excited, excitement, exhilarated, exhilarating, exhilaration, thrill, thrilling, zeal |

TABLE II-continued

Illustrative list of search keywords for Level-3 emotions.

| Level - 3 Emotions | Search Keywords |
| --- | --- |
| affection | adoration, affection, care, compassion, fond, fondness, like, liking, love, loving, sentimental, tender, tenderness, worship |
| gratitude | appreciate, appreciation, grateful, gratitude, thank |
| lust | desire, lust, passion, sexual desire |
| disappointment | bored, boredom, disappointed, disappointment, disappointing |
| neglect | defeat, dejection, embarrassed, embarrassment, homesickness, humiliated, humiliation, insecure, insecurity, insult, insulted, insulting, loneliness, lonely, neglect, rejection |
| sadness | depressed, depression, despair, gloom, gloomy, glum, grief, hopeless, hopelessness, melancholy, miserable, misery, sad, sadness, sorrow, unhappy, woe |
| shame | guilt, guilty, regret, regretful, remorse, shame |
| suffering | agony, anguish, hurt, pain, suffer, suffering, torment, torture, trauma |
| sympathy | pathetic, pitiful, pity, sympthy |
| surprise | amazed, amazement, astonished, astonishment, surprise, surprised, surprising |

As seen in Table II, the keywords may be synonymous with or have a different shade meaning than the words in Level-3 emotions. It should be understood that that the aforementioned list of keywords may be dynamic and iterative, where the computer updates the list of keywords after a query to a data repository.

The search keywords for querying the one or more image repositories may be action-concept keyword pairs. For instance, each of the Level-2 emotion may represent an action that can be paired with a concept, which may include common nouns, such as objects and people. Table III shows Level-2 emotions and illustrative action keywords.

TABLE III

Level-2 emotions and illustrative action keywords

| anger | fear | joy | love | sadness | surprise |
| --- | --- | --- | --- | --- | --- |
| angry | fear | happy | loving | sad | surprised |
| fighting | horrified | delighted | lovely | heartbroken | astonished |
| rage | scared | smiling | cuing | sorrowful | amazed |
| punching | afraid | pleasing | passionate | pessimistic | shock |
| yelling | terrified | successful | tender | hurt | shocking |
| irritated | terrifying | peaceful | sentimental | depressed | awe |
| irritating | hiding | | passion | depressing | |
| annoyed | panic | | affection | weep | |

TABLE III-continued

Level-2 emotions and illustrative action keywords

| anger | fear | joy | love | sadness | surprise |
| --- | --- | --- | --- | --- | --- |
| mad | frightening | | worship | displeasure | |
| cursing | frightened | | like | disappointed | |
| | | | romantic | unhappy | |
| | | | | sorrow | |
| | | | | homesick | |
| | | | | crying | |
| | | | | lonely | |

The action keywords may be associated with concept keywords, shown in Table IV.

TABLE IV

Illustrative concept keywords to be associated with Level-2 action keywords
Concepts dog, baby, guy, girl, teenager, people, couple, family, crowd, tiger, scenery, cat, amusement park, bird, house, event, soldier, teacher, horse, lion, team, gift, athletes, boxer, dancer, car, room, bridge, tower, flower, leaf, tree, train The action keywords Table III may be associated with concept keywords of Table IV to generate illustrative action-concept keyword pairs as shown in Table V.

TABLE V

Illustrative action concept pairs

| concepts | action-concept pairs |
| --- | --- |
| anger | angry dog, angry baby, angry guy, angry cat, angry couple, angry family, angry crowd, angry tiger, mad dog, mad baby, mad guy, mad teenager, mad girl, mad couple, mad teacher, annoyed baby, annoyed couple, annoyed girl, annoyed cat, annoyed teacher, irritating baby, irritating girl, irritated cat, irritated girl, irritated guy, irritated couple, irritated dog, irritaed lion, yelling dog, yelling baby, yelling guy, yelling girl, yelling teacher, yelling teenager, yelling couple, yelling family, yelling crowd, yelling cat, yelling horse, yelling lion, rage baby, rage teenager, rage crowd, rage tiger, rage lion, figting baby, fighting guy, fighting couple, fighting events, fighting family, fighting horse, fighting lion, fighting tiger, punching baby, punching guy, punching face, punching girl, teacher cursing, boxer punching, angry athletes, angry soldier, yelling soldier |
| fear | fear baby, fear scenery, scared cat, scared family, scared girl, scary fish, scary clown, scary house, scared dog, scared baby, scared guy, scared teenager, scared couple, scared teacher, scared house, scary bridge, scary tower, scary tree, scary room, scary train, scary scenery, scary evein, scary gift, horrified guy, panic face, frightening face, frightening baby, frightening girl, frightening couple, frightening scenery, frightening events, frightening room, frightening tree, frightening bridges, frightening gif, terrified horse, terrified baby, terrified girl, terrified guy, terrified couple, terrifying baby, terrifying guy, terrifying couple, terrifying events, terrifying room, terrifying tree, terrifying bridge, terrifying tower, terrifying house, hiding girl, panic scenery, guy afraid, girl afraid, couple afraid |

TABLE V-continued

Illustrative action concept pairs

| concepts | action-concept pairs |
|---|---|
| joy | happy dog, happy baby, happy guy, happy scenery, happy cat, happy family, happy beach, happy sunset, happy crowd, amusement park, happy bird, lovely moutain, lovely river, happy tiger, delighted dog, delighted baby, delighted guy, delighted girl, delighted cat, delighted family, delighted teenager, delighted tree, delighted face, smiling dog, smiling cat, smiling baby, smiling guy, smiling girl, smiling family, smiling teenager, smiling team, smiling event, smiling scenery, smiling teacher, smiling soldier, smiling dancer, pleasing scenery, pleasing tree, pleasing bird, pleasing cat, peaceful scenery, peaceful tree, peaceful bridge, peaceful house, peaceful flower, peaceful family, peaceful baby, peaceful girl, successful baby, successful dog, successful guy, successful guy, successful teenager, successful scenery, successful family, successful team, successful event, successful teacher, successful boxer, successful dancer, successful people |

Figure 9A:
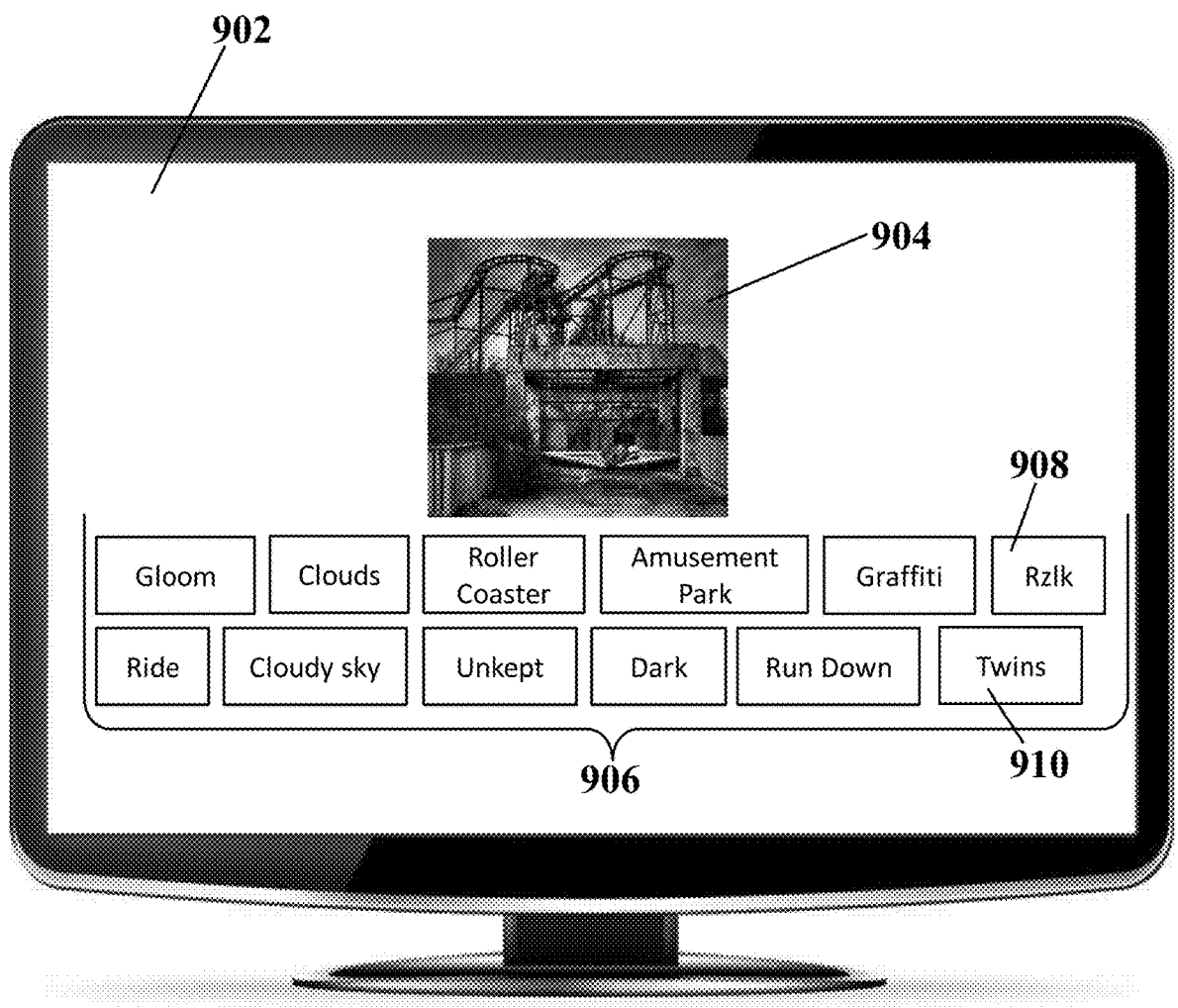
FIG. 9A shows a graphical user interface for showing one or more tags associated with a retrieved image, according to an illustrative embodiment.

The computer may query one or more image repositories using any of the aforementioned keywords. The one or more repositories may be in remote servers or in local computers. Within the repositories, the image files may be in any format such as JPEG, PNG, BMP, and/or PDF. The computer may retrieve the images based on the keywords. The retrieved images are therefore weakly labeled, i.e., the search keywords themselves may be the tags for the retrieved images. The tags for these retrieved images may have been added by users that have uploaded the images to the one or more repositories. In some embodiments, one or more computers associated with the repositories may provide user selectable tags for the user when uploading an image to the repositories. FIG. 9A, as described below, shows an illustrative graphical user interface (GUI) displaying an image and tags associated with the image.

In a next step 404, the computer may filter the retrieved images and/or tags to generate a set of training images. As a part of the filtering process, the computer may remove images with non-English tags. The computer may further remove duplicate images or images with similar contents. In some embodiments, the computer may train a text classifier based on the tags and their emotion class such that the text classifier may predict an emotion class of an image tag. The computer may use the text classifier to predict the emotion classes from the retrieved images. The computer may then remove the images with inconsistent predictions. For example, if the computer receives an image in response to a happy emotion class keyword and the text classifier predicts the emotion class of anger, the computer may discard the image. The text classifier as implemented by the computer may use any kind of machine learning model. In some embodiments, the computer may use a Naïve Bayes machine learning classifier. In this machine learning model, the computer may select the most discriminative tags based on the entropy of the tags. The computer may then train the text classifier based on the selected tags. In other words, the computer may bootstrap from the text classifier to remove images having tags with a lower confidence levels.

In next steps 406, 408, 410 the computer may train a convolutional neural network using the set of training images and the emotion tags (or simply tags) associated with the set of training images. The method 400 shown herein details three training stages, where the specificity of the classes of tags may increase at each successive stage. The computer may iteratively train the CNN, beginning with broader set of classes, and use the previous stage of training as an a priori knowledge for subsequent training with more specific set of classes. In other words, the computer may implement, in the webly supervised learning method 400, the hierarchical grouping of the emotion tags as a curriculum and train the CNN hierarchically with this curriculum.

Mathematically, let $t \in [1 \ldots T]$ be the hierarchical training stages and let the training image set at stage t denoted by $Tr_t = \{(x_i, y_i)\}_i^n$, where n may represent the number of images in the training set and $y_i$ may represent the emotion label corresponding to $x_i$ among $C_t$ categories. Let $C_T = C$ represent the fine-grained emotional categories that trained CNN should be able to predict. The goal therefore may be to arrive at the prediction of the C labels at the final training stage T. In this hierarchical training method 400, a stage to stage mapping operator F may be used, where the mapping operator F may project $C_T$, the output labels at stage T, to lower dimensional $C_{T-1}$, which may be easier to predict compared to the prediction of the $C_T$ labels. More formally, $C_{T-1} := F(C_T)$, where $F: C_T \rightarrow C_{T-1}$, $C_T \geq C_{T-1}$. In the illustrative Parrot's grouping described herein, the mapping operator is provided by the hierarchical grouping of C categories into six secondary and two primary level emotions. However, it should be understood that is grouping is provided as an example and for the ease of explanation and any form of mapping operator should be considered within the scope of this disclosure.

In step 406, the computer may train the CNN using the set of training images and set of Level-1 emotion tags (or simply tags) associated with the training images. The Level-1 may include binary labels of "positive" and "negative." The computer may train the CNN in multiple cycles implementing backpropagation training process. Before the start of the training, the CNN may include randomized weights. A combination of the randomized weights may indicate probabilistic outputs for each of the Level-3 emotion tags. For example, an output for the positive and negative outcome may be [0.5, 0.5], indicating that the untrained CNN is equally likely to predict a positive and a negative emotion for an image based on the randomized weights. During a forward pass of the training, the computer may feed the training images to the CNN and identify the probabilistic prediction of the CNN. The computer may calculate a loss function for the probabilistic prediction, i.e., the computer may calculate the difference between the predicted result and the ground truth. Based on the loss function, the computer may perform a backward pass on the CNN to determine the weights that contributed most to the loss function and adjust those weights such that the loss decreases. The computer may then update one or more weights in the CNN based on the forward and backward passes. The computer may repeat the cycle of forward pass, loss function, backward pass, and the weight update until the prediction outcomes reach a predetermined threshold.

In step 408, the computer may train the CNN using the set of training images using Level-2 emotion tags associated with the training images. The Level-2 tags may include the six classes of "anger", "fear", "joy", "love", "sadness", "surprise," and/or other synonyms. Step 408 may start with a CNN already trained in step 406, i.e., the CNN at the beginning of the training in step 408 may already have adjusted weights from the training in step 406. In other words, the weights in the CNN may not be completely random at the beginning of the step 408. The computer, therefore, in step 408, may take in a CNN with partially adjusted weights and perform a next training iteration for a further fine tuning of the weights. The computer may train the CNN in multiple cycles implementing a backpropagation training process. During a forward pass of the training, the computer may feed the training images to the CNN and identify the probabilistic prediction of the CNN. The computer may calculate a loss function for the probabilistic prediction, i.e., the computer may calculate the difference between the predicted result and the ground truth. Based on the loss function, the computer may perform a backward pass on the CNN to determine the weights that contributed most to the loss function and adjust those weights such that the loss decreases. The computer may then update one or more weights in the CNN based on the forward and backward passes. The computer may repeat the cycle of forward pass, loss function, backward pass, and the weight update until the prediction outcomes reach a predetermined threshold.

In step 410, the computer may train the CNN using the set of training images a Level-3 of tags associated with the training images. The Level-3 tags may include the twenty-five classes of "affection," "cheerfulness," "contentment," disappointment," "disgust," "enthrallment," "envy," "exasperation," "gratitude," "horror," "irritability," "lust," "neglect," "nervousness," "optimism," "pride," "rage," "relief," "sadness," "shame," "suffering," "surprise," "sympathy," and "zest," and/or their synonyms as shown in Table II. Step 410 may start with a CNN already trained in step 408, i.e., the CNN at the beginning of the training in step 410 may already have adjusted weights from the training in step 408. In other words, the weights in the CNN may not be completely random at the beginning of the step 410. The computer, therefore, in step 410, may take in a CNN with partially adjusted weights and perform a next training iteration for a further fine tuning of the weights. The computer may train the CNN in multiple cycles implementing backpropagation training process. During a forward pass of the training, the computer may feed the training images to the CNN and identify the probabilistic prediction of the CNN. The computer may calculate a loss function for the probabilistic prediction, i.e., the computer may calculate the difference between the predicted result and the ground truth. Based on the loss function, the computer may perform a backward pass on the CNN to determine the weights that contributed most to the loss function and adjust those weights such that the loss decreases. The computer may then update one or more weights in the CNN based on the forward and backward passes. The computer may repeat the cycle of forward pass, loss function, backward pass, and the weight update until the prediction outcomes reach a predetermined threshold.

Figure 9B:
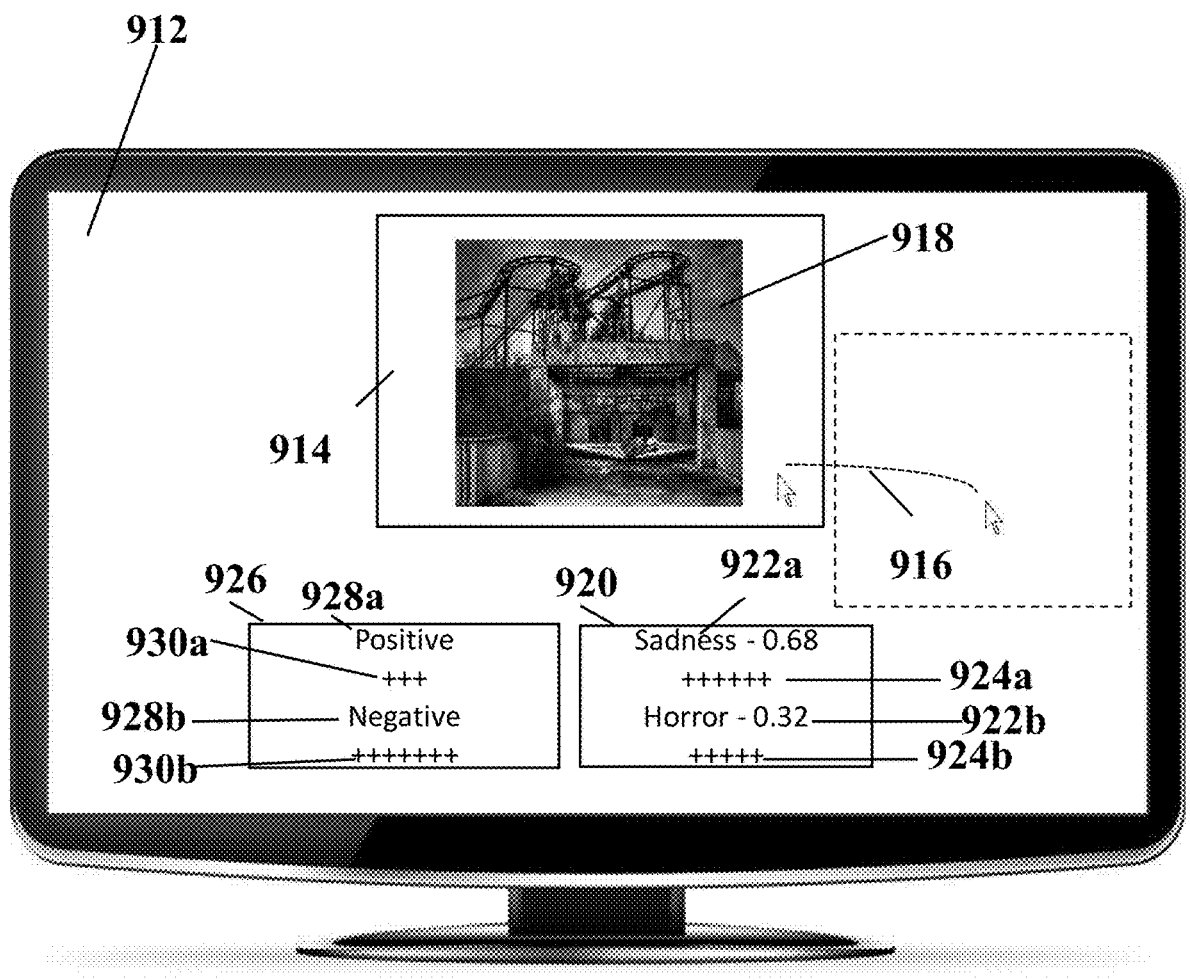
FIG. 9B shows a graphical user interface for determining emotion of an image using a trained convolutional neural network, according to an illustrative embodiment.

After the training iterations in steps 406, 408, 410 the computer may generate a fully trained CNN that may predict emotions in images more accurately than the conventionally trained neural networks. Accordingly, in step 412, a user may input a new image into the trained CNN. Then the CNN can predict the emotion in the image based on its training. FIG. 9B, as described below, shows an illustrative graphical user interface (GUI) displaying emotions predicted by the CNN for an image.

Figure 5A:
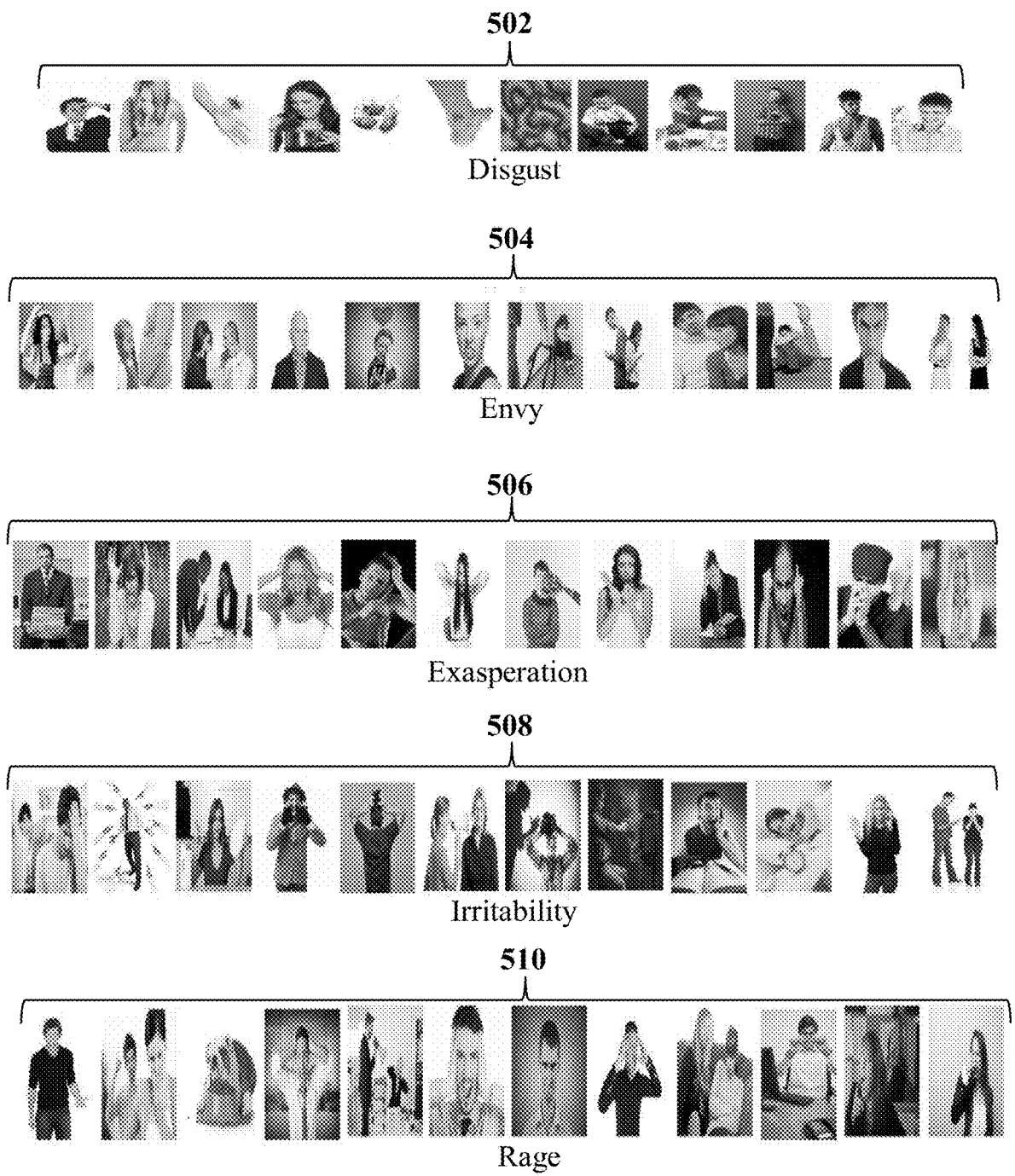
FIGS. 5A-5E show sample images retrieved using keywords for Level-3 emotion classes and used for training a convolutional neural network, according to an illustrative embodiment.
Figure 5B:
Figure 5C:
Figure 5D:
Figure 5E:

FIGS. 5A-5E shows illustrative sample images retrieved using keywords for Level-3 emotion classes. The keywords for Level-3 emotion classes are shown in Table II above. As shown in FIG. 5A, sample images 502 may be associated with "disgust," sample images 504 may be associated with "envy," sample images 506 may be associated with "exasperation," sample images 508 may be associated with "irritability," and sample images 510 may be associated with "rage." As shown in FIG. 5B, sample images 512 may be associated with "confusion," sample images 514 may be associated with "horror," sample images 516 may be associated with "nervousness," sample images 518 may be associated with "cheerfulness," and sample images 520 may be associated with "contentment." As shown in FIG. 5C, sample images 522 may be associated with "enthrallment," sample images 524 may be associated with "optimism," sample images 526 may be associated with "pride," sample images 528 may be associated with "relief," and sample images 530 may be associated with "zest." As shown in FIG. 5D, sample images 532 may be associated with "affection," sample images 534 may be associated with "gratitude," sample images 536 may be associated with "lust," sample images 538 may be associated with "disappointment," and sample images 540 may be associated with "neglect." As shown in FIG. 5E, sample images 542 may be associated with "sadness," sample images 544 may be associated with "shame," sample images 546 may be associated with "suffering," sample images 548 may be associated with "sympathy," and sample images 550 may be associated with "surprise." A computer may use these sample images to train a convolutional neural network (CNN), as described above.

Figure 6:
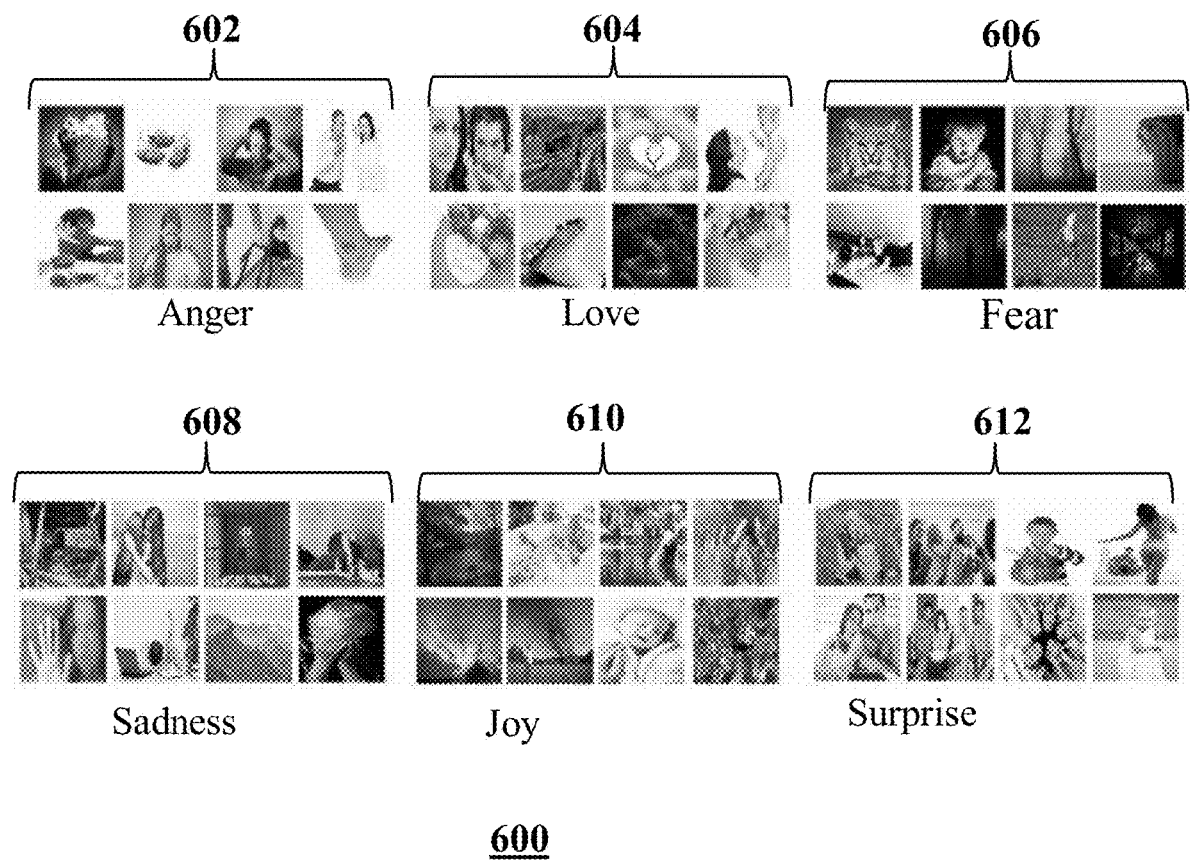
FIG. 6 shows sample images for Level-2 emotion classes and used for training a convolutional neural network, according to an illustrative embodiment.

FIG. 6 shows illustrative sample images 600 for Level-2 emotion classes. A computer may derive the sample images 600 from the sample images retrieved using keywords for Level-3 emotion classes, as shown in FIGS. 5A-5E. As shown herein, sample images 602 may be associated with "anger," sample images 604 may be associated with "love," sample images 606 may be associated with "fear," sample images 608 may be associated with "sadness," sample images 610 may be associated with "joy," and sample images 612 may be associated with "surprise."

Figure 7:
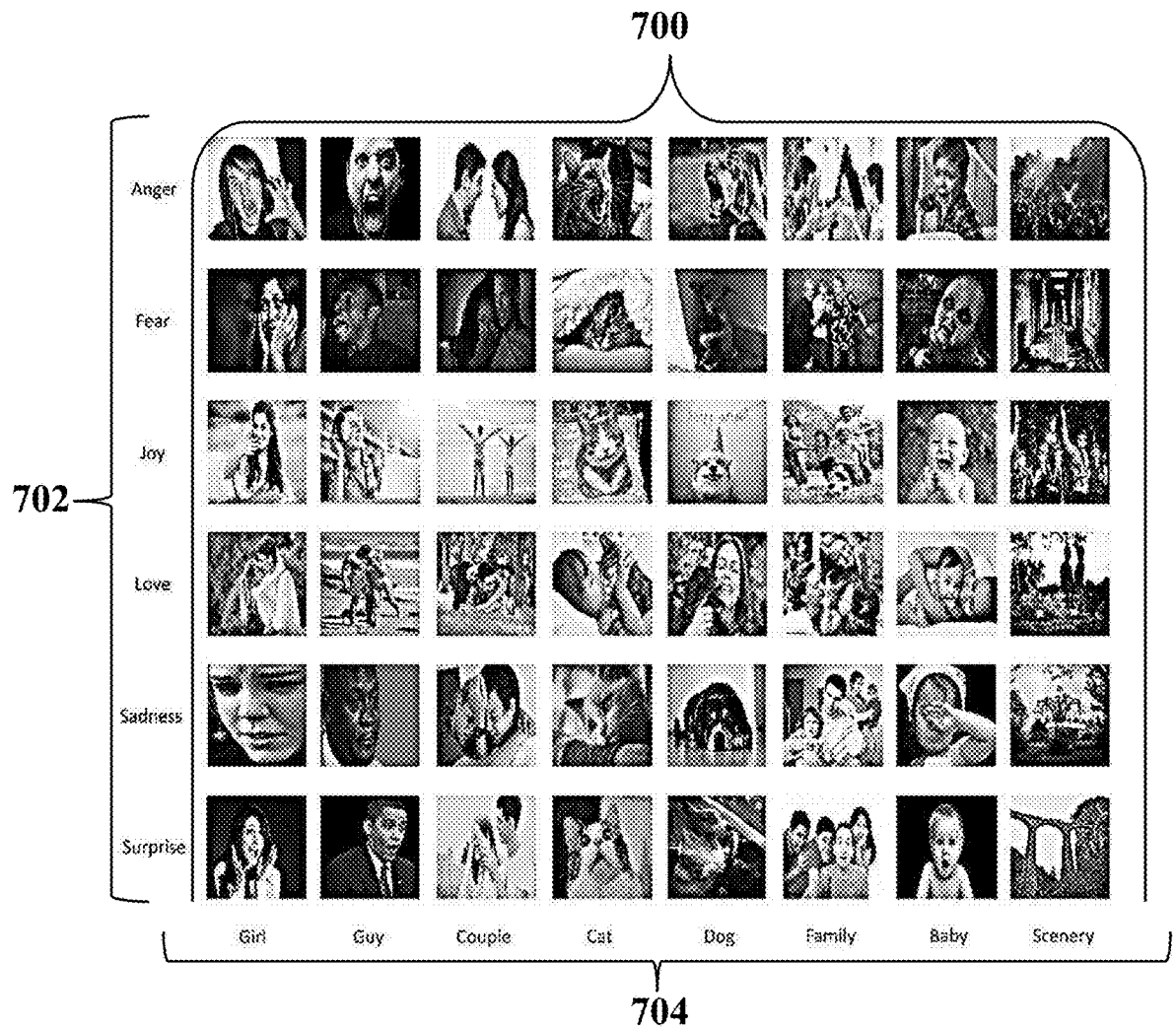
FIG. 7 shows sample images retrieved using action-concept keywords for Level-3 emotion classes and used for training a convolutional neural network, according to an illustrative embodiment.

FIG. 7 shows illustrative sample images 700 retrieved by a computer using action-concept pairs as shown in Table IV. As shown herein, the actions 702 in the action-concept pair may include "anger," "fear," "joy," "love," "sadness," and "surprise. Furthermore the concepts 704 in the action-concept pair may include "girl," "guy," "couple," "cat," "dog," "family," "baby," and "scenery." The computer may use the sample images 700 to train a convolutional neural network (CNN), as described above.

Figure 8:
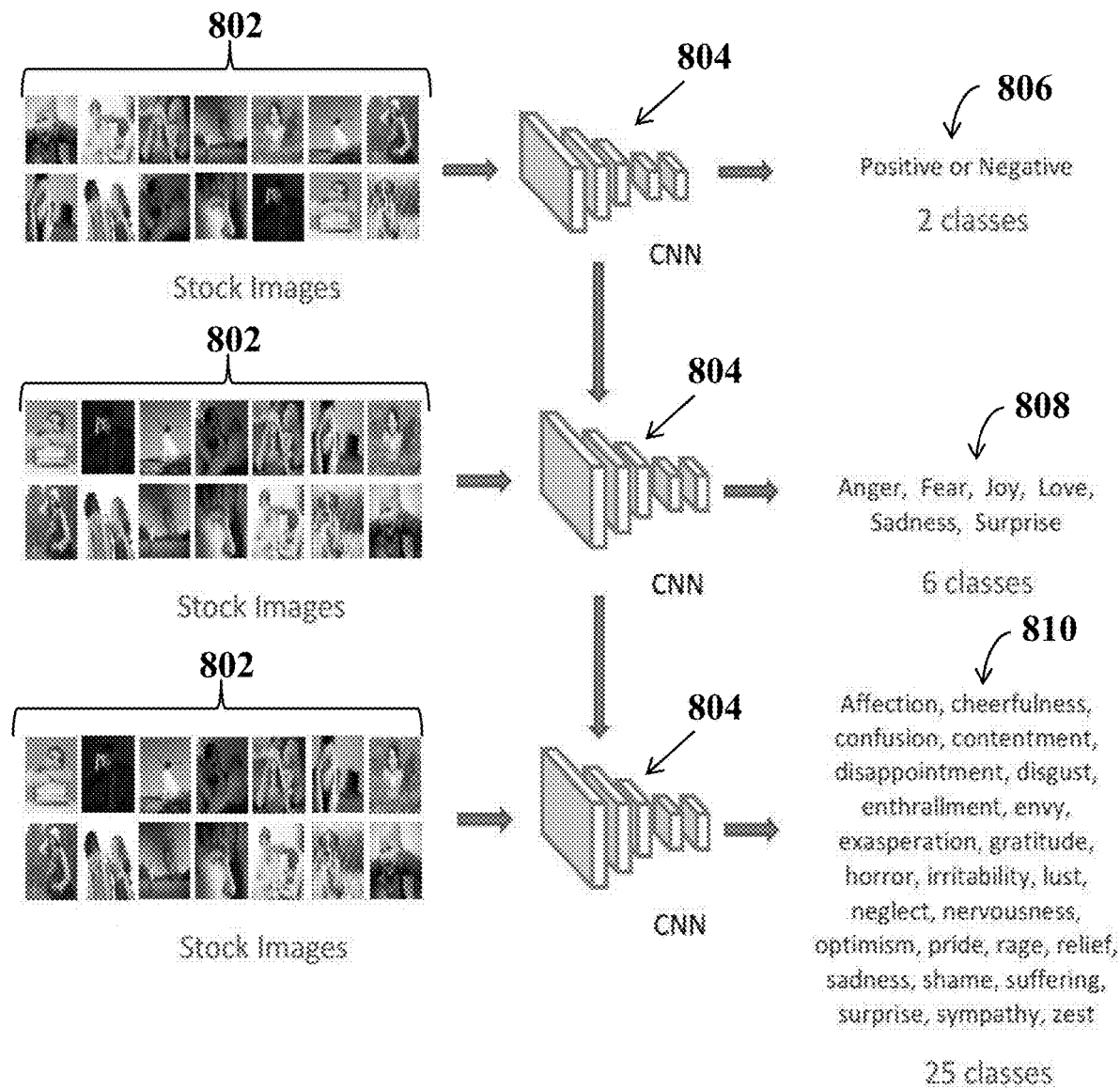
FIG. 8 shows a process diagram for training a convolutional neural network, according to an illustrative embodiment.

FIG. 8 shows a process diagram 800 of training a convolutional neural network (CNN), according to an illustrative embodiment. In a first training iteration, a computer may input stock images 802 with tags 806 to a CNN 804. The tags 806 may represent the classes of Level-1 emotions. The computer may use a backpropagation method in the first training iteration to update one or more weights (also known as filters) of the CNN 804. In a second training iteration, the computer may input the stock images 802 with tags 808 to the CNN 804. The tags 808 may represent the classes of Level-2 emotions. The computer may use a backpropagation method in the second training iteration to further update the one or more weights of the CNN 804. In a third training iteration, the computer may input the stock images 802 with tags 810 to the CNN 804. The tags 810 may represent the classes of Level-3 emotions. The computer may use a backpropagation method in the second training iteration for a final update to the one or more weights of the CNN 810.

Therefore, the computer may perform a curriculum-guided training of the CNN 804 using the same stock images 802 at each training iteration, but with different tags 806, 808, 810 with increasing order of complexity for successive training iterations. The trained CNN 804 may use coarse (or general) weighing from a previous training iteration for a more complex, finer weighing in a next training iteration. As opposed to picking up the insignificant idiosyncrasies as does a conventional fully supervised trained neural network, the webly supervised CNN 804 may be able to generalize, and therefore may have more accurate prediction of emotions in images.

FIG. 9A shows a computer 900a configured to retrieve images based on the keywords, according to an illustrative embodiment. The computer 900a may display a graphical user interface (GUI) 902 showing an image 904 retrieved by the computer 900a based one or more search keywords. The GUI 902 may further show one or more tags 906 associated with the image 904. As shown, the tags 906 may include "gloom," "clouds," "roller-coaster," "amusement park," "graffiti," "rzlk," "ride," "cloudy sky," "unkempt," "dark," "run down," and "twins." As described above, the tags 906 may be noisy, but can be improved by cleaning (e.g., correct spelling, removing irrelevant words, removing repeated words, etc.) the tags 906 using one or more illustrative cleaning processes described above. For example, a "rzlk" tag 908 is misspelled and a "twins" tag 910 is irrelevant. Accordingly, the computer 900a may execute an image tag cleaner software module to clean (e.g., remove, correct spelling, etc.) the tags 908, 910 from the image 904. It should be understood that alternative configurations of the GUI 902 may be utilized to provide the same or analogous functionality.

FIG. 9B shows a computer 900b configured to infer emotions in images, according to an illustrative embodiment. The computer 900b may display a graphical user interface (GUI) 912 with a window 914, where a user can drag and drop 916 an image 918 to cause the image to be analyzed to infer an emotion thereof. At the back-end, the computer may invoke a trained convolutional neural network (CNN) to infer an emotion in the image 918. The computer 900b may display a second window or portion thereof 920 showing the emotions 922a, 922b (here, "sadness" and "horror") and the respective confidence levels 924a, 924b of the predictions. As shown herein, the confidence levels 924a, 924b may be symbolic to make it easier for the user to visualize, e.g., the higher the number of the symbols ("+"), the higher the confidence level of the prediction. As shown, the computer 900b may have predicted the "sadness" emotion 922a with a higher confidence compared to the "horror" emotion 922b as indicated by the respective confidence levels 924a, 924b. The computer 900b may also display in the GUI 912, a probability (or likelihood) for each prediction. As shown, the "sadness" emotion 922a may have a probability of 0.68 and the "horror" emotion 922b may have a probability of 0.32. The computer 900b may also display the predicted emotions 922a, 922b ranked based upon the respective probabilities. The "sadness" emotion 922a may have a higher probability (0.68) compared to the "horror" emotion 922b, and therefore the computer 900b, may display the "sadness" emotion 922a above the "horror" emotion 922b. The computer 900b may also display a window 926 showing hierarchically higher (i.e., coarser) predicted emotions of positive 928a and negative 928b. The computer 900b may also display the respective confidence levels 930a, 930b symbolically, as described above. It should be understood that alternative configurations of the GUI 912 may be utilized to provide the same analogous functionality.

The computer 900 may use the trained CNN to sort an album of images. For example, using the GUI 902, a user may input a set of images to be sorted based on the emotional content. The computer may invoke the trained CNN for each image in the set of images, and predict an emotion in the image. Based on the prediction, the computer may sort (or group) the received images. For example, the computer may have a first grouping for "happy" images and a second grouping for "sad" images. The computer 900 may use the trained CNN to infer emotion in a live video feed. The computer may select a frame from the live video feed, and input the selected frame to the trained CNN. The trained CNN may predict the emotion of the frame, and output the prediction to the user.

Figure 10A:
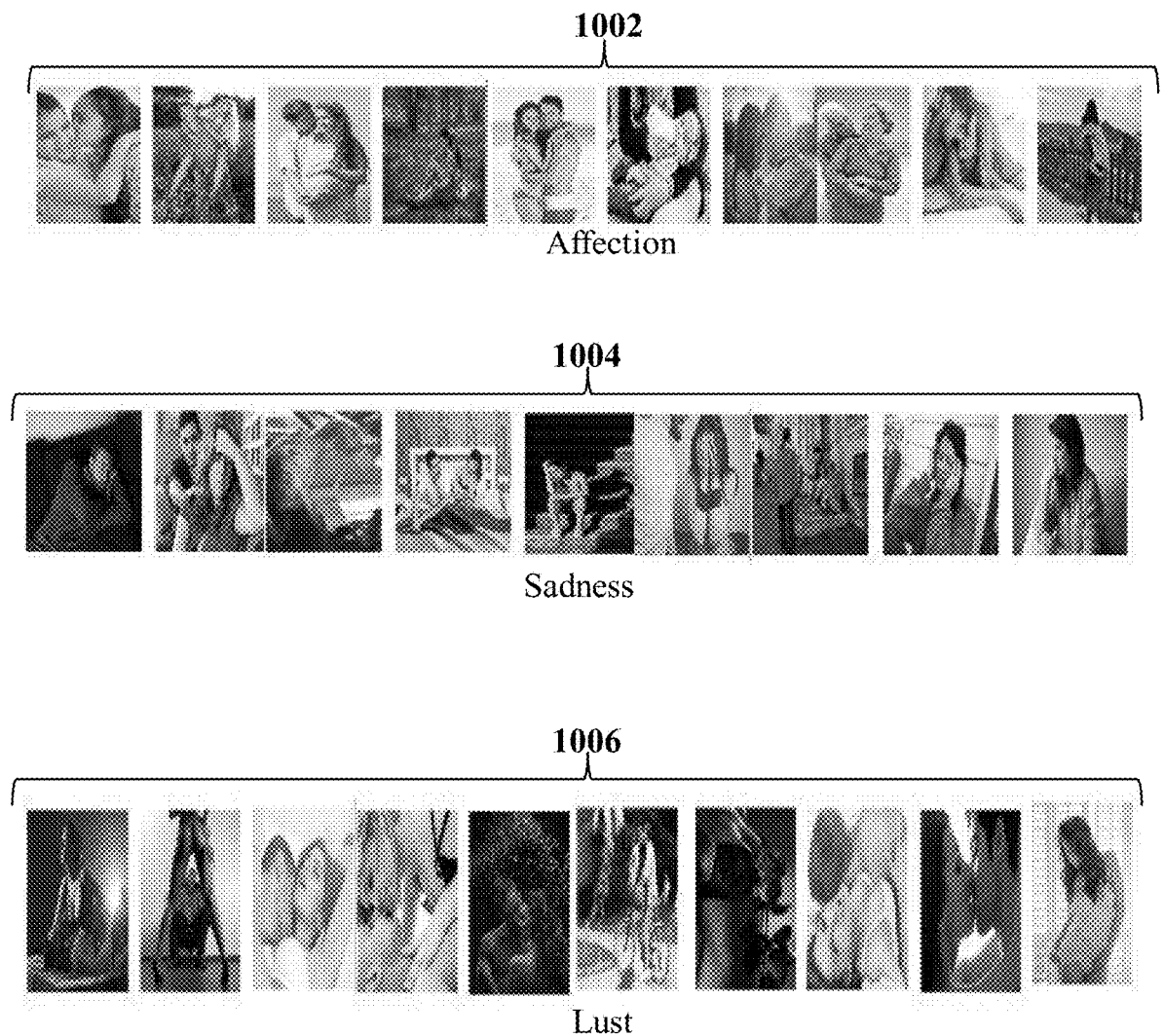
FIGS. 10A-10B show images whose emotion was accurately inferred by a trained convolutional neural network, according to an illustrative embodiment.
Figure 10B:
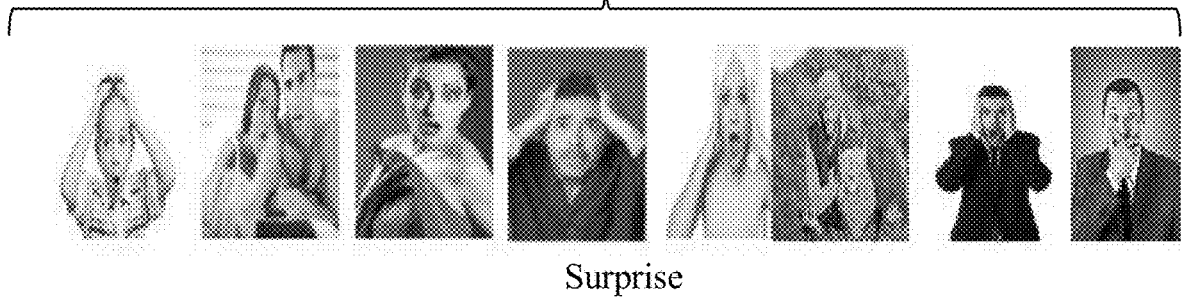
Figure 10B:
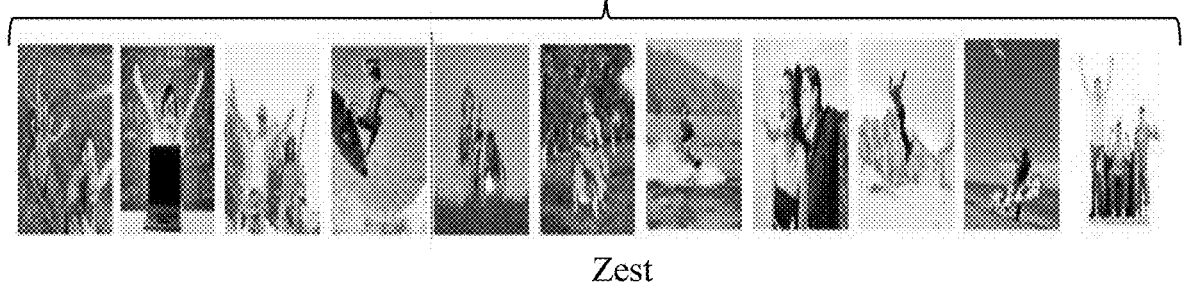
Figure 10B:
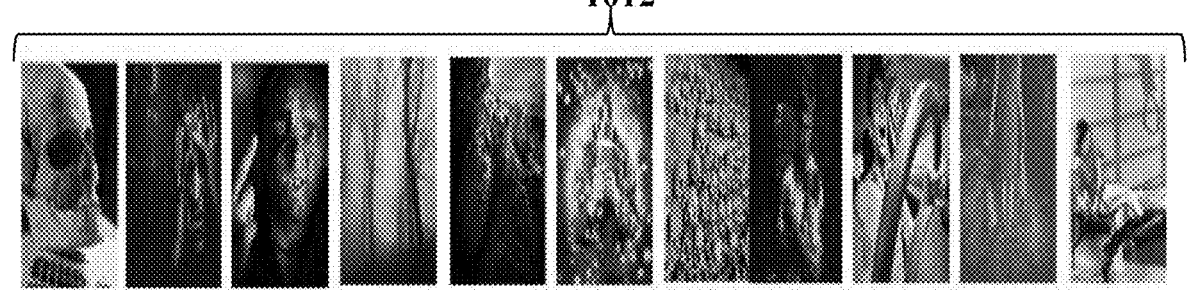

FIGS. 10A-10B show illustrative test images for which a trained convolutional neural network (CNN) makes an accurate prediction of the respective emotions. As shown in FIG. 10A, the trained CNN has accurately predicted: "affection" for test images 1002, "sadness" for test images 1004, and "lust" for test images 1006. As shown in FIG. 10B, the trained CNN has accurately predicted: "surprise" for test images 1008, "zest" for test images 1010, and "horror" for test images 1012.

Embodiments disclosed herein may be applied to other image retrieval and image classification processes. For example, a computer may implement a trained CNN to retrieve a personal photo album based on emotions. More specifically, the computer may retrieve photos with happy emotions or sad emotions. As another example, the computer may implement a trained CNN to infer emotions in advertisements to determine whether the advertisements are conveying the intended emotions. The computer may further predict emotions in images in real-time. As described above, a computer may predict emotions in a live video-feed.

Figure 11:
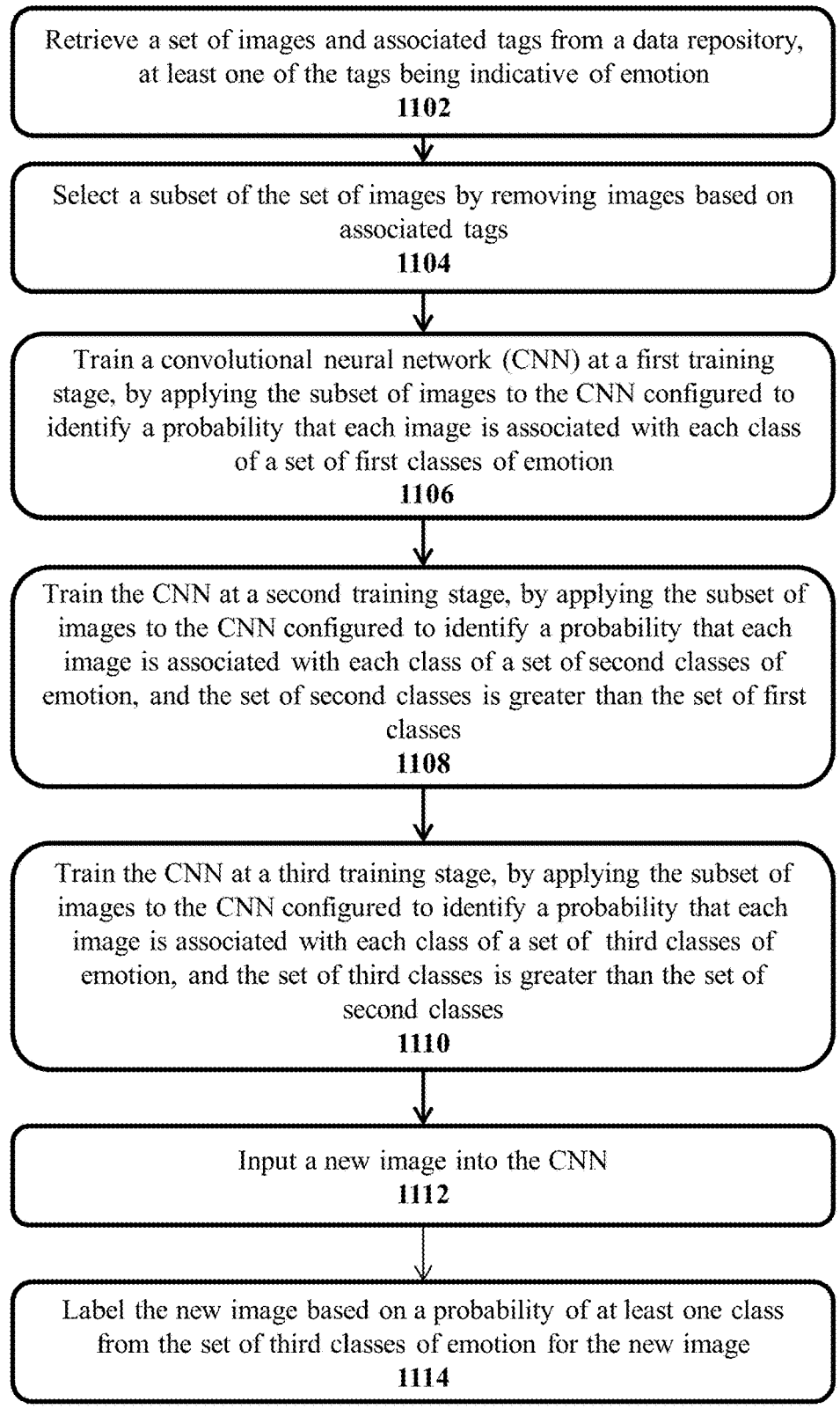
FIG. 11 shows a flow diagram of a method for webly supervised training of a convolutional neural network to infer emotions in images, according to an illustrative embodiment.

FIG. 11 shows a flow diagram 1100 for a webly supervised training of a convolutional neural network (CNN) to recognize emotions in images, according to an illustrative embodiment. Although multiple computers may execute the steps of the method shown in the flow diagram 1100, this description details, for brevity, a computer executing the steps of the method. It should also be understood that the method steps described below are merely illustrative and additional, alternate, and/or lesser number of steps should be considered to be within the scope of this disclosure.

The method may begin at step 1102, where the computer may retrieve a set of images and associated tags from a data repository, at least one of the tags being indicative of emotion. The data repository may be hosted by a webserver or a local computer. The computer may use search keywords based on Parrott's emotion wheel to query the data repository to retrieve the set of images. In step 1104, the computer may select a subset of the set of images by removing images based on associated tags. For example, the computer may remove duplicate images and images with non-English tags. In step 1106, the computer may train a convolutional neural network (CNN) at a first training stage by applying the subset of images to the convolutional neural network configured to identify a probability that each image is associated with each class of a set of first classes of emotion. The training at the first stage may cause an adjusting to at least one weighting within the CNN. In step 1108, the computer train the CNN at a second training stage by applying the subset of images to the convolutional neural network configured to identify a probability that each image is associated with each class of a set of second classes of emotion, and the set of second classes is greater than the set of first classes. The training at the second stage may cause an adjusting of at least one weighting of the CNN. In step 1110, the computer may train the CNN at a third training stage by applying the subset of images to the convolutional neural network configured to identify a probability that each image is associated with each class of a set of third classes of emotion, and the set of third classes is greater than the set of second classes. The training at the third stage may cause an adjusting of at least one weighting of the CNN. In step 1112, the computer may input a new image into the CNN. The new image may have been entered by a user to use the trained CNN to predict (or identify) an emotion in the image. In step 1114, the computer may label the new image based on a probability of at least one class from the set of third classes of emotion for the new image. In other words, the computer may use the trained CNN to predict (or identify) in the image at least one class of emotion from the set of third classes of emotion.

It can be shown experimentally that the embodiments in this disclosure may produce more accurate results, and in some cases surprisingly better results, across multiple datasets than conventional systems and methods. For example, it can be shown experimentally that the conventional datasets are inherently biased. To test the conventional datasets, two conventional datasets were selected and a third dataset was generated. The first dataset was a Deep Sentiment dataset containing 1269 images from Twitter. The second dataset was the currently available largest Deep Emotion dataset. The third dataset was generated as an Emotion-6 dataset of 8350 images for 6 emotion categories including anger: 1604 images, fear: 1280 images, joy: 1964 images, love: 724 images, sadness: 2221 images, and surprise: 557 images. The Emotion-6 dataset was labeled by five human subjects from an initial set of 150,000 images collected from Google and Flickr. The motivation for creating the Emotion-6 dataset was to repeat the conventional data collection/annotation for a fully supervised training. 500 images were sampled from the training portions of each of the three datasets and used to train a 3-class linear classifier over ResNet-50 features. The trained classifier was then tested on 100 random images from the test portions of each of the three datasets. The trained classifier was observed to be reasonably good at differentiating between the datasets, giving a 63.67% performance.

Figure 12:
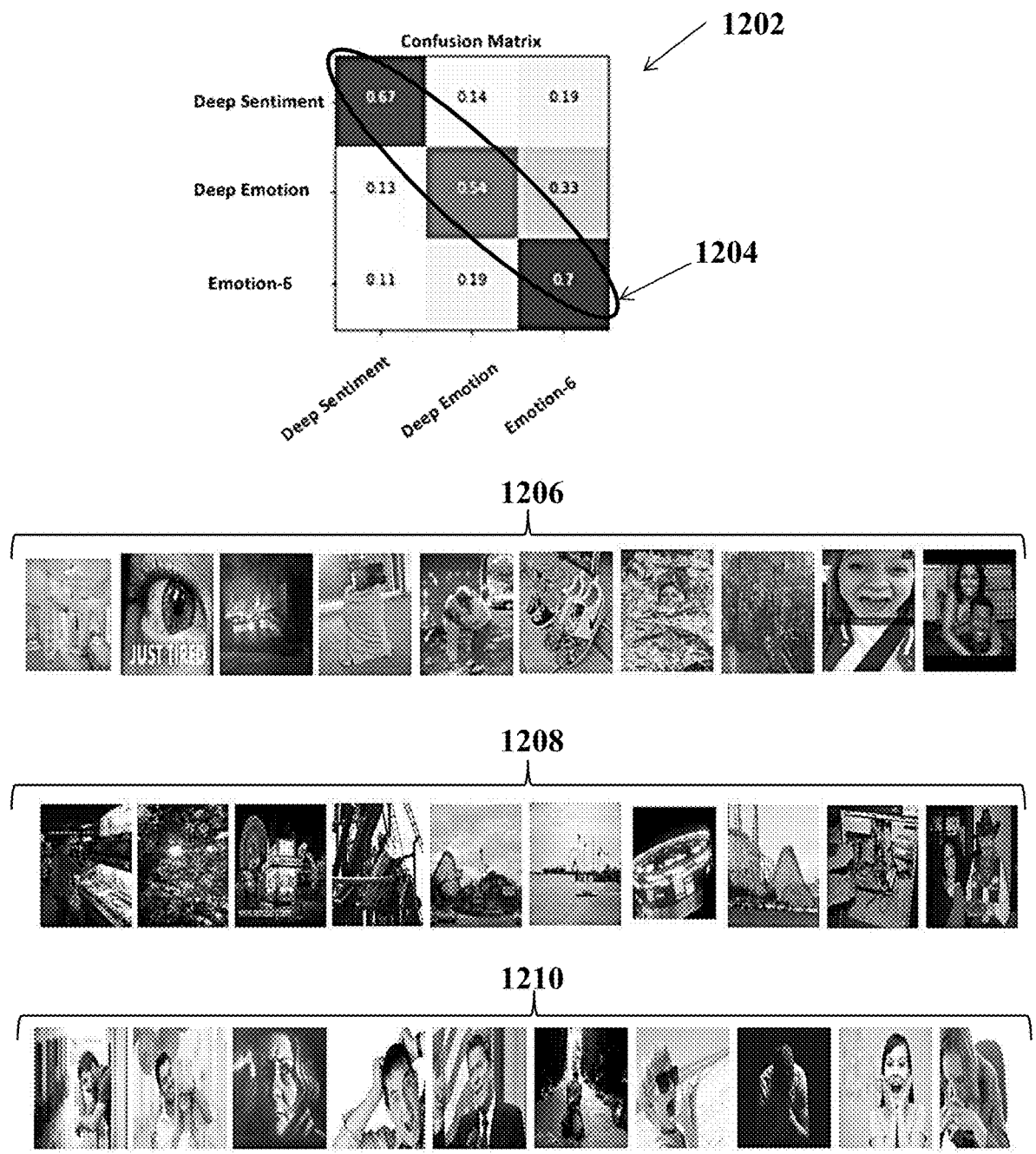
FIG. 12 shows test results of comparing biases across conventional datasets.

FIG. 12 shows the results of the test including a confusion matrix 1202 and images 1206, 1208, 1210 with high confidence correct predictions from Deep Sentiment, Deep Emotion, and Emotion-6 datasets respectively. In the confusion matrix 1202, the relatively higher entries of 0.67, 0.54, and 0.7 in a distinct diagonal 1204 show that these datasets possess a unique signature leading to the presence of a bias. For example, images 1208 with high confidence correct prediction for the Deep Emotion dataset show a preference for outdoor scenes mostly focusing on parks, and images 1210 with high confidence correct predictions for Emotion-6 dataset show a preference for scenes with a single object centered with a clean background and canonical viewpoint.

For all the three datasets, a conventional ResNet-50 classifier was trained to observe cross-dataset generalization, i.e., training on one dataset while testing on the other. For both Deep Emotion and Emotion-6, 80% of the images were randomly sampled for training while the rest 20% were left for testing. For Deep Sentiment, 90% of the images were randomly sampled for training and 10% were left for testing. Because exact emotion categories may vary from one dataset to another, this experiment included binary classification (positive vs. negative) accuracies, computed by transforming the predicted labels to two basic emotion categories of Parrott's emotion grouping. This test is labeled as a Binary Cross-Dataset Generalization Test, as the test asks a convolutional neural network (CNN) to predict the basic binary categories of "positive" and "negative" emotions in the test images. If a machine trained model cannot generalize well in this test, it may not work on more fine emotion categories.

Table VI shows a summary of the results from the Binary Cross-Dataset Generalization Test. As shown, diagonal numbers (encircled for more clarity) refer to training and testing on the same dataset while non-diagonal numbers refer to training on one dataset and testing on other datasets. The percentage drop refers to the performance drop across the diagonal and the average of non-diagonal numbers.

TABLE VI

Summary of the Results of a Binary Cross-Dataset Generalization

| | Test on: | | | |
|---|---|---|---|---|
| Train on: | Deep Sentiment | Deep Emotion | Emotion-6 | % Drop |
| Deep Sentiment | 78.74 | 68.38 | 49.76 | 24.98 |
| Deep Emotion | 61.41 | 84.81 | 69.22 | 22.99 |
| Emotion-6 | 54.33 | 64.28 | 77.72 | 23.69 |

Table VI shows, as expected, training and testing on the same dataset provides the best performance in all cases as shown by the encircled numbers in the diagonal. However, training on one dataset and testing on the other shows a significant drop in accuracy, for instance, the classifier trained on Deep Emotion dataset shows an average drop of 22.99% in accuracy while testing on other two datasets. The reason for this drop, as observed, was the small sizes of the emotion datasets. When the size is small, the dataset has a positive bias due to the lack of diversity in visual concepts. As a result, models trained using such small sized data essentially memorize its idiosyncrasies and lose the ability to generalize.

A quantifying negative bias test was performed to measure negative bias in different datasets. This test included three datasets, the conventional Deep Emotion dataset, the conventionally generated Emotion-6 dataset, and dataset based on keyword searches of images according to various embodiments of this disclosure (referred to as web emotion dataset). Three common emotion categories of anger, fear, and sadness were chosen for this test. For each dataset, a binary classifier (e.g., anger vs non-anger) was trained on its own set of positive and negative instances. For testing, the positives were selected from the dataset the classifier was trained on, but the negatives were selected from other datasets. The classifier was trained on 500 positive and 2000 images randomly selected from each dataset. For testing the classifier, 200 positive and 4000 negative images from other datasets were used.

Table VII summarizes the results of the quantifying negative bias test. As shown, "Self" refers to testing on the original test set while "Others" refers to the testing on set where positives come from the original dataset but negatives come from the other. "% Drop" refers to performance drop across the self and others. Vales in the "Others" represent the average numbers.

TABLE VII

Results of Quantifying Negative Bias Test

| Task | −ve set: | +ve set: Deep Emotion | Emotion-6 | web emotion |
|---|---|---|---|---|
| anger vs non-anger | Self/Others/% Drop | 90.64/78.98/12.86 | 92.49/83.56/9.57 | 83.90/83.37/0.63 |
| fear vs non-fear | Self/Others/% Drop | 85.95/80.77/6.05 | 81.14/76.02/2.56 | 82.97/84.79/−2.19 |
| sadness vs non-sadness | Self/Others/% Drop | 81.90/61.35/25.09 | 89.20/82.07/7.99 | 89.89/90.55/−0.73 |

For both conventional databases (Deep Emotion and Emotion-6), there is significant drop in performance across being tested on the dataset versus other datasets. For example, for sadness emotion, there is a 25% drop in performance for Deep Emotion dataset. However, for the web emotion database, there is no such significant drop in performance. The significant drop in performance in the conventional datasets suggests that some of the negative samples combing from other datasets are confused with positive examples. This indicates that rest of the dataset does not well represent the rest of the visual world resulting in overconfident and not very discriminative classifiers.

A correlation analysis with object/scene categories was performed on the Deep Emotion and Emotion-6 datasets. The objective of this test was to observe the correlations between emotions with object/scene categories and whether an analysis of correlations can help to identify the presence of bias in emotion datasets. For this test, ResNet-50 pre-trained on ImageNet and RestNet-152 pre-trained on Places365 were used as object and scene recognition models respectively. The analysis included predicting object/scene categories from images of three common emotion categories used in previous task. To 200 most occurring object/scene categories from each emotion class were selected and conditional entropy of each object/scene category across positive and negative set of a specific emotion was computed. Mathematically, given an object/scene category c and emotion category e, the conditional entropy is computed as $H(Y|X=c) = -\Sigma_{y \in \{e_p, e_n\}} p(y|X=c) \log p(y|X=c)$, where $e_p$ and $e_n$ represent the positive and negative set of emotion e respectively, for example, anger and non-anger. More number of object/scene categories with zero conditional entropy may most likely lead to a biased dataset as it shows the presence of these object/scene categories in either positive or negative set of an emotion resulting in an unbalanced representation of the visual world.

Figure 13:
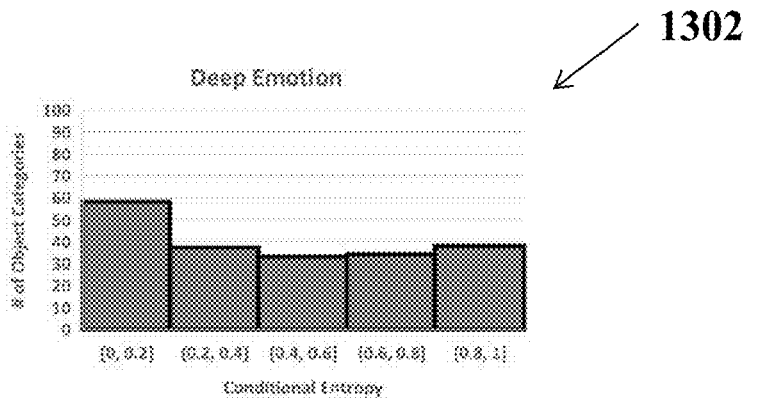
FIG. 13 shows charts illustrating distribution of conditional entropy for conventional datasets.
Figure 13:
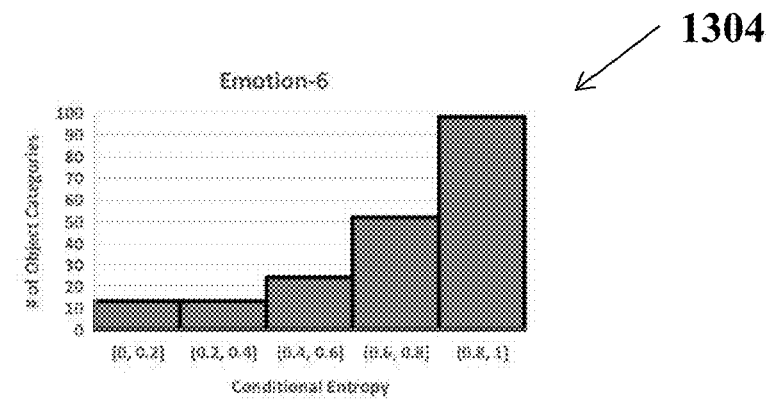
Figure 13:
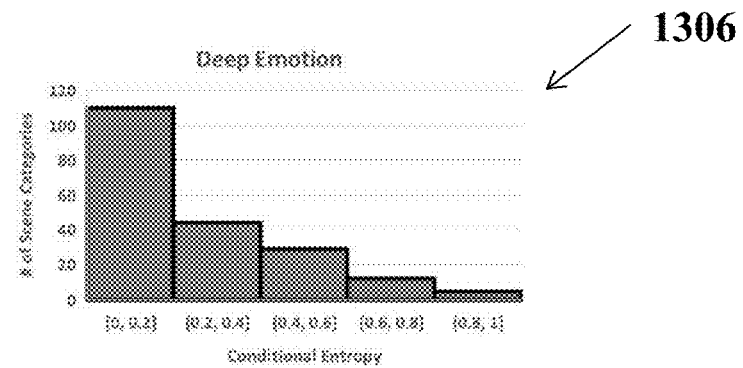
Figure 13:
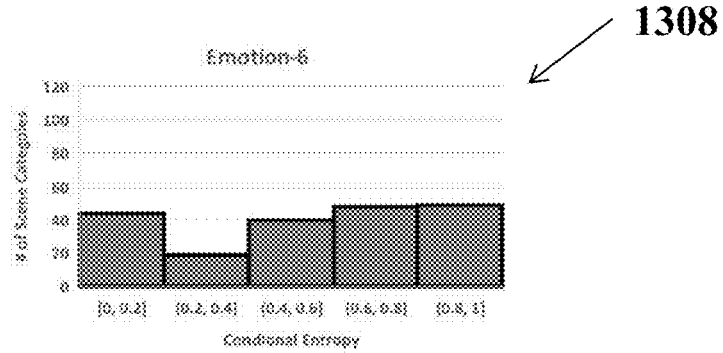

FIG. 13 shows charts 1302, 1304, 1306, 1308 showing distribution of object/scene categories with respect to conditional entropy for Deep Emotion and Emotion-6 datasets. An analysis of correlations between objects and sadness emotion the charts 1302, 1304 shows that about 30% object categories (zero conditional entropy) are only present in either sadness or non-sadness category. For example, objects such as balloon, candy store, and parachute, are only present in set(s) of non-sadness. Categories like balloon are strongly related to happiness, but still there should be a few negative balloon images, such as sad balloon, in the negative set. Completely missing the negative balloon images may lead to dataset bias. Emotion-6 appears to be less biased compared to Deep Emotion, but Emotion-6 still it has 25% of object categories in the entropy range of [0, 0.5]. Furthermore, an analysis of scene categories for anger emotion in charts 1306, 1308 shows a bias towards specific scene categories.

For Deep Emotion, about 55% of scene categories have zero conditional entropy, while about 20% of categories have zero entropy in Emotion-6.

The main conclusions that can be derived from the tests described above may be: (1) despite the fact that all three datasets (Deep Sentiment, Deep Emotion, and Emotion-6) are collected from the Internet and labeled using similar paradigm involving multiple humans, these datasets appear to have a bias that obstructs training a generalizable emotion recognition model and (2) for a better performance, a machine trained model should be trained on a very large-scale less-biased emotion dataset. However, emotion labeling of such a large scale dataset can be very expensive, time-consuming, and may often require specialists to avoid design bias.

Therefore, the conventional fully supervised paradigm of creating datasets and training models fails: it is expensive to create the dataset and train a model and yet the trained model fails to make accurate predictions. In contrast, the curriculum guided webly supervised training is less expensive and more efficient and the trained model is more accurate than the conventional models.

The quantifying negative bias test describe above was repeated for the dataset (web emotion) generated based on the embodiments described herein. The same number of images, total 2500 for training and 4200 for testing, were used and same testing protocol as above was used to analyze negative bias in the web emotion dataset. The results of this test are shown in Table VII above. As shown, convolutional neural networks (CNNs) trained using the web emotion dataset does not seem to be affected by a new negative set across all three emotion categories as seen in the rightmost column. The reason is because web emotion dataset benefits from a large variability of negative examples and therefore more comprehensively represents the visual world of emotions.

Figure 14:
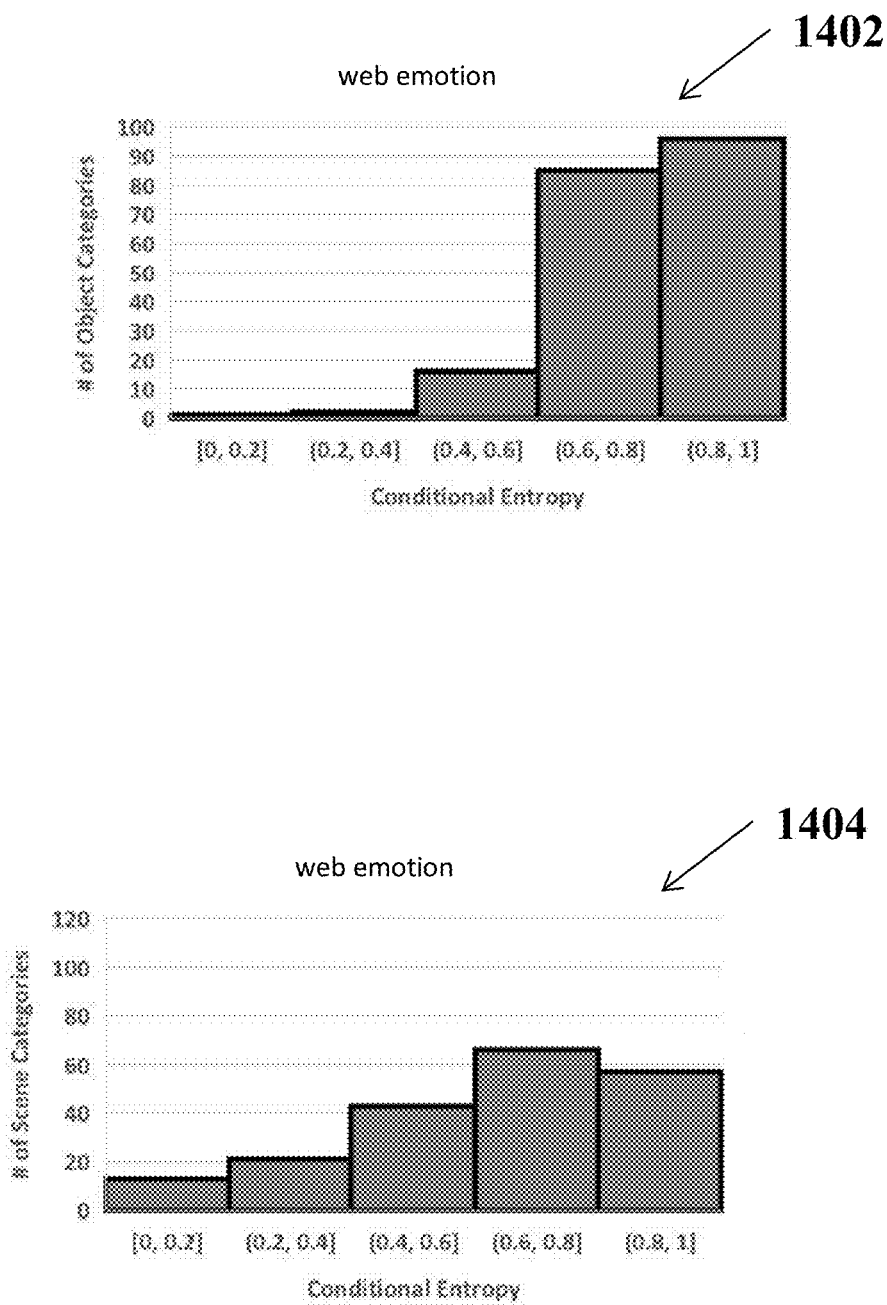
FIG. 14 shows charts illustrating distribution of conditional entropy for a dataset generated according to an illustrative embodiment.

The correlation analysis with object/scene categories test described above was repeated for the web emotion dataset. The results of this test are shown in FIG. 14. As seen in chart 1402, less than 10% of object categories in the web emotion dataset are within the entropy range of [0, 0.6] for sadness emotion thereby indicating a much less biased dataset. This result showing the less biased dataset is consistent with the performance of a classifier (CNN) trained with the web emotion dataset as shown in Table VII. Furthermore, chart 1404 shows a larger number of scene categories having entropy in a higher range, indicating that most of scenes are well distributed across positive and negative emotion sets in our dataset. A further bias minimization can be done by adding weakly labeled images associated with zero entropy categories such that both positive and negative set can have a balanced distribution.

The binary cross-dataset generalization test described above may be repeated for the web emotion dataset. Table VIII summarizes the results for this test. The following can be observed from the results in Table VIII: (1) models trained using web emotion dataset show the best generalization ability compared to the models trained using manually labeled emotion datasets. This is because training using web data helps in minimizing the aforementioned dataset biases by covering a wide variety of emotion concepts. (2) on the Emotion-6 dataset, a model trained using the web emotion dataset outperforms the model trained with images from the same Emotion-6 dataset (77.72% vs 78.38%).

TABLE VIII

Results of Binary Cross-Dataset Generalization for web emotion dataset

| | Test on: | | | | | |
|---|---|---|---|---|---|---|
| Train on: | Deep Sentiment | Deep Emotion | Emotion-6 | web emotion | Self | Mean Others |
| Deep Sentiment [5] | 78.74 | 68.38 | 49.76 | 47.79 | 78.74 | 55.31 |
| Deep Emotion [1] | 61.41 | 84.81 | 69.22 | 59.95 | 84.81 | 63.52 |
| Emotion-6 (Sec. 3) | 54.33 | 64.28 | 77.72 | 64.30 | 77.72 | 62.30 |
| web emotion | 68.50 | 71.42 | 78.38 | 81.41 | 81.41 | 72.76 |

Experiments were also performed to understand and quantify the effectiveness of curriculum guided learning (or training). For example, an analysis of cross-dataset generalization performance was conducted by comparing the following methods: (1) direct learning-directly learning using noise web images of 25 fine grained emotion categories; (2) self-directed learning-start learning with a small clean set (500 images) and then progressively adapt the model by refining the noisy web data; (3) Joint Learning-simultaneously learning with all the tasks in a multi-task setting. Table IX summarizes the results of this experiment.

TABLE IX

Comparison of different webly supervised learning strategies

| Methods | Deep Sentiment | Deep Emotion | Emotion-6 | web emotion | Self | Mean Others |
|---|---|---|---|---|---|---|
| Direct Learning | 62.20 | 67.48 | 74.73 | 76.65 | 76.65 | 68.13 |
| Self-Directal Learning | 64.56 | 68.76 | 76.15 | 76.69 | 78.69 | 69.82 |
| Joint Learning | 66.71 | 69.08 | 75.36 | 78.27 | 78.27 | 70.38 |
| Curriculum Learning | 68.50 | 71.42 | 78.38 | 81.41 | 81.41 | 72.76 |

The following observations may be made from the results shown in Table IX: (1) performance of direct learning baseline is much worse compared to the curriculum guided learning as described in the embodiments disclosed herein. This is because emotions and complex and ambiguous that directly learning models to categorize such fine-grained details fail to learn discriminative features. (2) self-directed learning shows better generalization compared to direct learning but still suffers from the requirements of initial labeled data. (3) the joint learning baseline is better than direct learning and self-directed learning, but is still worse than curriculum guided learning (70.38% vs 72.7%). This lower result is because by ordering training/learning from easy to difficult task in a sequential manner, a model is able to learn more discriminative features for recognizing complex emotions.

Further experiments were performed to observe the impact of emotion categories and impact of dataset size. To observe the impact of emotion categories, the three stage curriculum learning strategy (2-6-25) was compared with a two stage curriculum learning strategy (2-6) including only six fine grained emotion categories. The results showed that the latter strategy produced inferior results with an accuracy of 78.21% on the self-test set and a mean accuracy of 70.05% on other two datasets compared to 81.41% and 72.76% respectively of the three stage curriculum learning. To observe the impact of the dataset size, 25,000 images were randomly subsampled from the web emotion dataset and used to train a model using the curriculum guided learning. The model trained using this subset produced an accuracy of 69.04% on the self-test and a mean accuracy of 64.9% on other datasets, compared to 81.41% and 72.76% respectively of the full dataset.

Figure 15:
FIG. 15 shows a unbiased emotion test sets, according to an illustrative embodiment.

An experiment was performed to test a trained model on cross-domain unbiased data. In this experiment, an unbiased emotion test set containing about 3000 images downloaded from Google was generated. The unbiased emotion test set was designed to contain challenging emotions, for example, different emotions with the same object/scene. FIG. 15 shows a set of sample images 1502 in the unbiased emotion test set. Every image in the set of sample images 1502 shows a baby but with a different emotion. Because the source of the test set is different from the web emotion dataset, it helps alleviate the dataset bias in evaluation, so that the generalization ability of various learning strategies in a less biased manner can be compared. For this experiment, 80% of the images in the unbiased emotion set were used for training and 20% of the images were used for testing. Table X shows the result that the curriculum guided training/learning with 74.27% accuracy outperformed other strategies.

TABLE X

Results of an Experiment using an Unbiased Emotion Dataset

| Methods | Accuracy (%) |
|---|---|
| ImageNet | 64.20 |
| Direct Learning | 71.64 |
| Self-Directed Learning | 72.45 |
| Joint Learning | 71.64 |
| Curriculum Learning | 74.27 |

FIG. 15 further shows sample prediction results for sets of images 1504, 1506, 1508, 1510. As shown, the trained model has accurately predicted different emotions of a set of images 1504 all showing a baby. The trained model has also accurately predicted different emotions in the set of images 1506 all showing a couple. Similarly, the trained model has accurately predicted different emotions in the set of images 1508 all showing a scenery. Finally, the trained model has accurately predicted different emotions in the set of images 1510 all showing a group.

Figure 16:
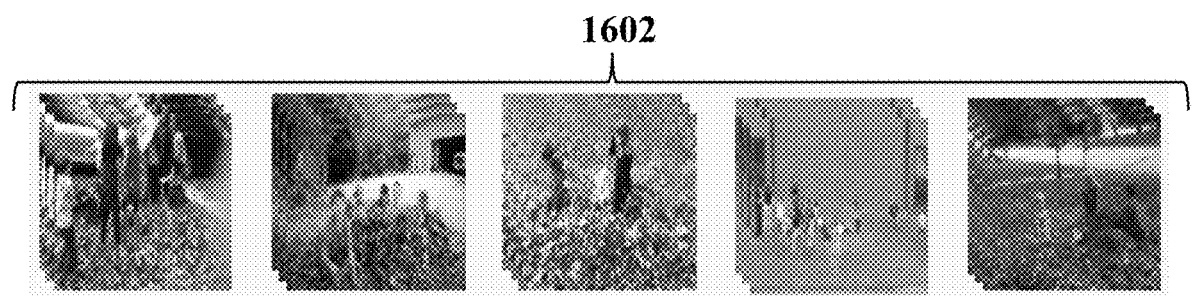
FIG. 16 shows video frames whose emotional summary was generated by an illustrative trained model.

A further experiment was conducted with a trained model in combination with a video summarization algorithm. The dataset used was the CoSum dataset containing videos covering 10 topics from the SumMe benchmark. The videos were segmented into multiple non-uniform shots for processing. First, pool5 features were extracted from the trained model, trained by curriculum guided approach using the web emotion dataset. Temporal mean pooling was then used to computer a single shot-level feature vector. It was found that by using the trained model, the top-5 mAP score of a summarization method improved by a margin of about 3% over C3D features (68.7% to 71.2%). FIG. 16 shows a central emotion of joy extracted by the trained from video frames 1602 of videos showing "Kids Playing in Leaves." Other emotions with respective video frames may additionally and/or alternatively be identified, real-time or non-real-time utilizing the principles described herein.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
   retrieving, by a computer, a set of images and associated tags from a data repository, at least one of the tags being indicative of emotion;
   selecting, by the computer, a subset of the set of images by removing images based on associated tags;
   training, by the computer, a convolutional neural network at a first training stage, the first training stage includes applying the subset of images to the convolutional neural network configured to identify a probability that each image is associated with each class of a set of first classes of emotion, thereby adjusting at least one weighting within the convolutional neural network;
   training, by the computer, the convolutional neural network at a second training stage, the second training stage includes applying the subset of images to the convolutional neural network configured to identify a probability that each image is associated with each class of a set of second classes of emotion, and the set of second classes is greater than the set of first classes;
   training, by the computer, the convolutional neural network at a third training stage, the third training stage includes applying the subset of images to the convolutional neural network configured to identify a probability that each image is associated with each class of a set of third classes of emotion, and the set of third classes is greater than the set of second classes, each of the first, second, and third training stages causing at least one weighting of the convolutional neural network to be adjusted;

inputting, by the computer, a new image into the convolutional neural network; and labelling, by the computer, the new image based on a probability of at least one class from the set of third classes of emotion for the new image.

2. The method of claim 1, wherein selecting the subset of the set of images comprises:

cleaning, by the computer, associated tags to generate a second set of associated tags.

3. The method of claim 2, wherein cleaning associated tags comprises:

removing, by the computer, associated tags to that are unrelated to an image in the subset of the set of images.

4. The method of claim 2, wherein cleaning associated tags comprises:

removing, by the computer, non-English tags from the associated tags.

5. The method of claim 1, further comprising:

querying, by the computer, the data repository through an internet search using one or more search keywords.

6. The method of claim 1, wherein the associated tags include user-generated tags.

7. The method of claim 1, wherein the set of second classes of emotion is more granular than the set of first classes of emotion.

8. The method of claim 1, wherein the set of third classes emotion is more granular than set of second classes of emotion.

9. The method of claim 1, further comprising:

receiving, by a computer, a second set of images;

inputting, by the computer, the second set of images into the convolutional neural network;

labelling, by the computer, each image in the second set of images with one or more classes of emotion; and sorting, by the computer, the second set of images based on the one or more classes of emotions labelled to each image in the second set of images.

10. The method of claim 1, further comprising:

receiving, by the computer, a real time video feed;

selecting, by the computer, a frame in the real time video feed;

inputting, by the computer, the selected frame in the real time video feed into the convolutional neural network; and labelling, by the computer, the selected frame with at least one class of emotion.

11. A computer implemented method comprising:

receiving, by a convolutional neural network hosted on a computer, an input from a graphical user interface of a new image and an associated tag;

generating, by the convolutional neural network hosted on the computer, for the new image an emotion tag corresponding to one or more classes of emotions, whereby the convolutional neural network is trained with a plurality of stages that identify a probability that a training image is associated with a hierarchical class of emotions comprised of a lower and a higher hierarchical set of classes of emotions, wherein the lower hierarchical set is more granular than the higher hierarchical set, each stage causing an adjusted weighting of the convolutional neural network, and whereby the convolutional neural network uses the associated tag to generate a probability that the new image is associated with a class of emotion within the hierarchical class of emotions; and outputting, by the computer, the emotion tag for display on a revised graphical user interface.

12. The method of claim 11, further comprising:

cleaning, by the computer, a set of unfiltered tags associated with the new image to generate a set of filtered tags containing the associated tag.

13. The method of claim 12, wherein cleaning further comprises:

removing, by the computer, one or more unfiltered tags that are unrelated to the new image.

14. The method of claim 12, wherein cleaning further comprises:

removing, by the computer, non-English tags from the unfiltered tags.

15. The method of claim 12, wherein the set of unfiltered tags includes user-generated tags.

16. The method of claim 11, wherein the plurality of stages comprises at least three stages.

17. The method of claim 11, wherein within the hierarchical class of emotions, a different hierarchical set of classes of emotion is more granular than the lower hierarchal set of classes of emotions.

18. The method of claim 11, wherein the emotion tag is same as the associated tag.

19. A computer readable non-transitory medium containing one or more computer instructions, which when executed by a processor cause the processor to:

select a subset of a set of images by filtering images based on associated tags;

iteratively train a neural network at a plurality of stages,
each stage applying the convolutional neural network to identify a probability that each image is associated with an emotion in a class of emotions,
each stage applying a new class of emotions with more emotions than in a previous stage, and
each stage causing an adjusted weighting of the neural network; and label a new image inputted into the neural network based on a probability of at least one emotion from a class of emotions from the latest stage.

20. The computer readable non-transitory medium of claim 19, wherein when selecting the subset of the set of images, the one or more computer instructions further cause the processor to clean associated tags to generate a second set of associated tags.

* * * * *